(12) United States Patent
Ohta et al.

(10) Patent No.: US 7,782,420 B2
(45) Date of Patent: Aug. 24, 2010

(54) OPTICAL ELEMENT COVERING MEMBER, BACKLIGHT, AND LIQUID CRYSTAL DISPLAY DEVICE

(75) Inventors: Eiji Ohta, Miyagi (JP); Toru Abiko, Miyagi (JP); Masayasu Kakinuma, Miyagi (JP); Ken Hosoya, Miyagi (JP); Taku Ishimori, Miyagi (JP); Shigehiro Yamakita, Miyagi (JP); Shogo Shinkai, Miyagi (JP)

(73) Assignee: Sony Corporation, Tokyo (JP)

( * ) Notice: Subject to any disclaimer, the term of this patent is extended or adjusted under 35 U.S.C. 154(b) by 197 days.

(21) Appl. No.: 12/099,648

(22) Filed: Apr. 8, 2008

(65) Prior Publication Data

US 2008/0252812 A1  Oct. 16, 2008

(30) Foreign Application Priority Data

Apr. 10, 2007  (JP) .............................. 2007-103348

(51) Int. Cl.
*G02F 1/1335* (2006.01)
*F21V 7/04* (2006.01)
*F21V 5/00* (2006.01)

(52) U.S. Cl. .................. 349/64; 362/618; 362/620; 362/624; 362/626

(58) Field of Classification Search ............ 349/60, 349/64; 362/618, 620, 624, 626
See application file for complete search history.

(56) References Cited

U.S. PATENT DOCUMENTS 7,085,061 B2   8/2006   Watanabe

FOREIGN PATENT DOCUMENTS

| JP | 2001-272509 | 5/2001 |
|----|-------------|--------|
| JP | 2005-301147 | 11/2005 |

*Primary Examiner*—Jerry T Rahll
(74) *Attorney, Agent, or Firm*—K&L Gates LLP

(57) ABSTRACT

An optical element covering member is provided which can suppress degradation in display performance caused by warping and undulation. The optical element covering member includes at least one optical element, a support medium supporting the optical element; and a covering member covering the optical element and the support medium. In the above optical element covering member, the covering member has a Vicat softening point of more than 85° C., and at least one surface of the covering member, which covers the support medium, has a coefficient of thermal expansion in the range of 85% to 160% of the coefficient of thermal expansion of the support medium.

22 Claims, 20 Drawing Sheets

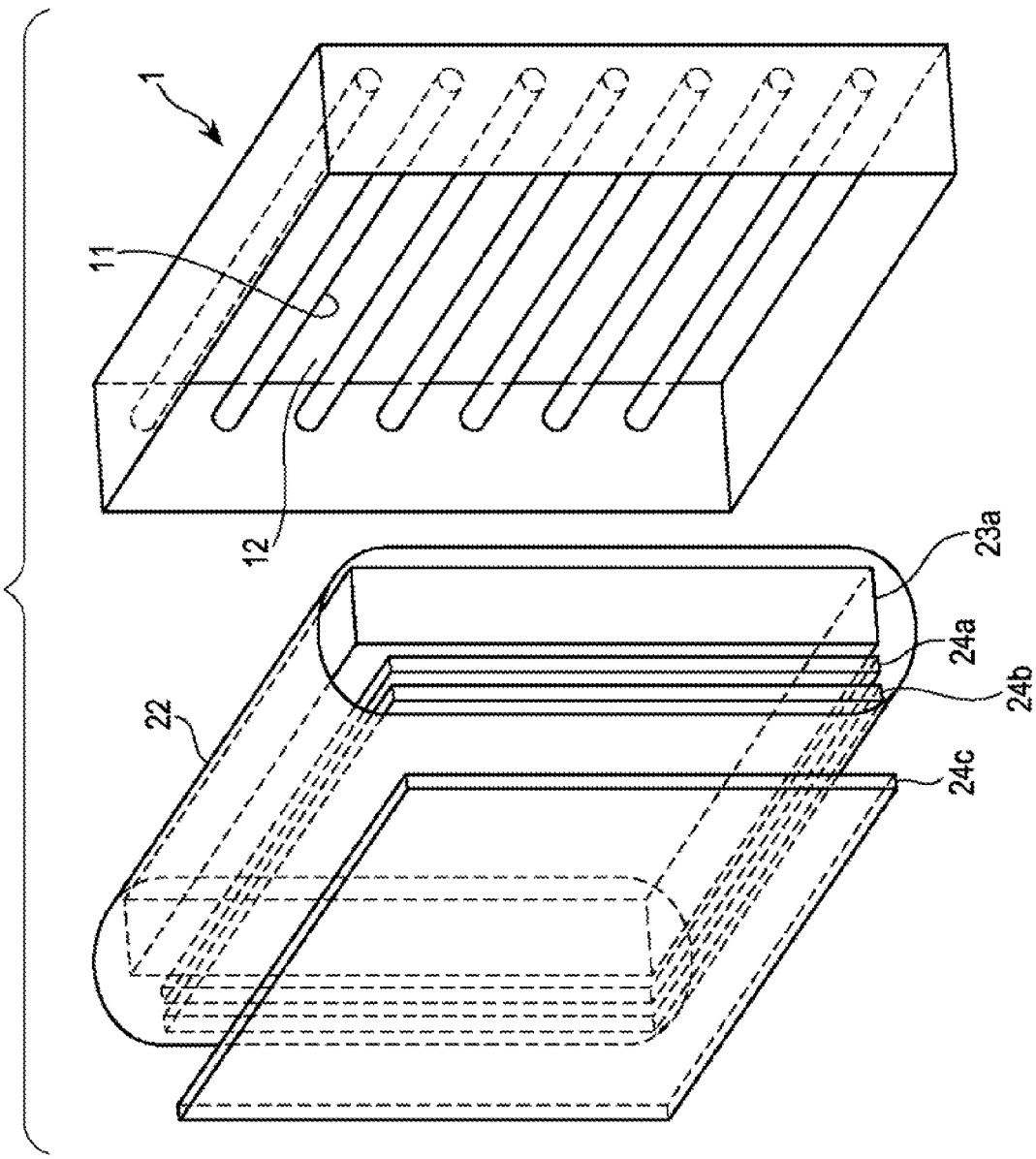

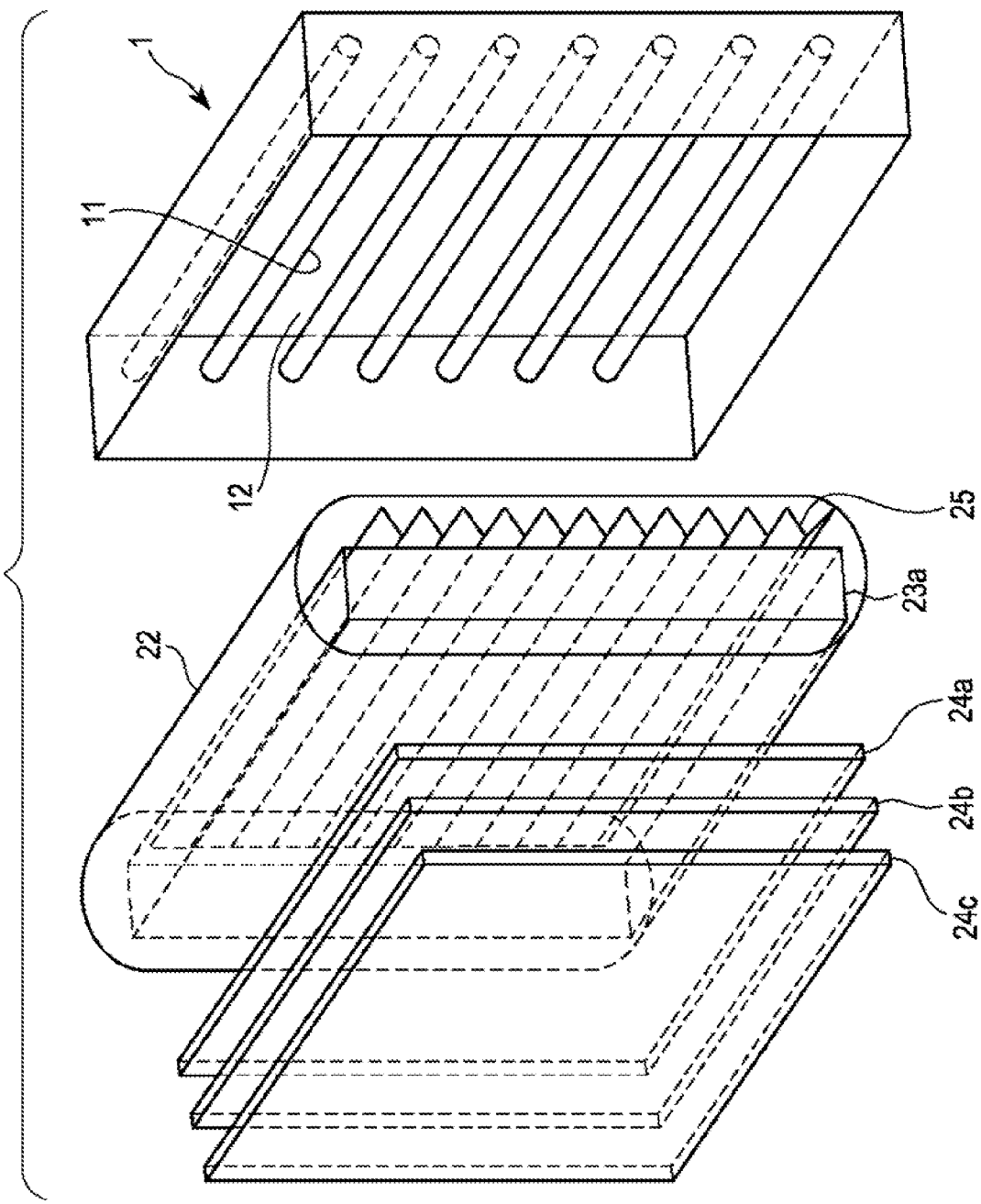

FIG. 20A
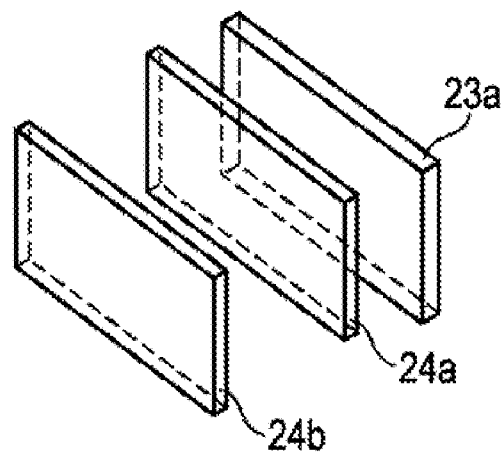
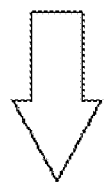
FIG. 20B
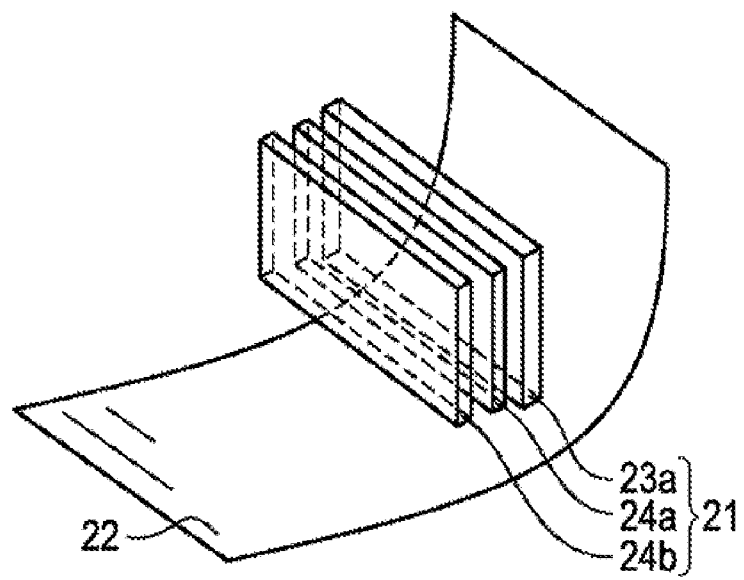

OPTICAL ELEMENT COVERING MEMBER, BACKLIGHT, AND LIQUID CRYSTAL DISPLAY DEVICE

CROSS REFERENCES TO RELATED APPLICATIONS

The present application claims priority to Japanese Patent Application JP 2007-103348 filed in the Japanese Patent Office on Apr. 10, 2007, the entire contents of which are incorporated herein by reference.

BACKGROUND

The present application relates to an optical element covering member, a backlight, and a liquid crystal display device, the latter two of which include the above optical element covering member, and more particularly relates to an optical element covering member which improves display properties of a liquid crystal display device.

Heretofore, in a liquid crystal display device, many optical elements are used in order to improve the viewing angle, the luminance, and the like. As the optical elements, for example, films and/or sheets, such as a diffusion film and/or a prism sheet, have been used.

FIG. 23 shows the structure of a related liquid crystal display device. This liquid crystal display device has, as shown in FIG. 23, a lighting element 101 emitting light, a diffusion plate 102 diffusing the light emitted from the lighting element 101, a plurality of optical elements 103 condensing and/or diffusing the light which is diffused by the diffusion plate 102, and a liquid crystal panel 104.

In recent years, concomitant with an increase in size of an image display device, the weight and the size of an optical element tend to be increased. When the weight and the size of an optical element are increased as described above, the rigidity thereof becomes insufficient, and as a result, the optical element is unfavorably deformed. The deformation of the optical element as described above has adverse influence on light directivity to a display surface, and a serious problem, so-called luminance irregularity, may arise.

Accordingly, it has been proposed that by increasing the thickness of an optical element, insufficient rigidity is improved. However, since the thickness of a liquid crystal display device is unfavorably increased, advantages thereof, such as a small thickness and light weight, are diminished. Hence, it has also been proposed that by bonding optical elements to each other by a transparent adhesive, insufficient rigidity of each optical element in the form of a sheet or film is improved (for example, see Japanese Unexamined Patent Application Publication No. 2005-301147).

However, according to the technique disclosed in Japanese Unexamined Patent Application Publication No. 2005-301147, since the optical elements are bonded to each other by a transparent adhesive, the thickness of the liquid crystal display device itself is also increased although the increase is not so much as that by the above method in which the thickness of the optical element itself is increased. In addition, by the use of the transparent adhesive, display properties of the liquid crystal display device may be degraded in some cases. Furthermore, since the number of manufacturing steps is increased, the yield of non-defective products may be seriously influenced, for example, by dust contamination which may occurs during a bonding step.

SUMMARY

Accordingly, it is desirable to provide an optical element covering member which can suppress an increase in thickness of a liquid crystal display device and degradation in display properties thereof and which can also improve insufficient rigidity of an optical element, and it is also desirable to provide a backlight and a liquid crystal display device, each of which includes the above optical element covering member.

In order to improve insufficient rigidity of an optical element while an increase in thickness of a liquid crystal display device and degradation in display properties thereof are suppressed, research was conducted and as a result, an optical element covering member in which at least one optical element and a support medium are covered by a covering member was discovered.

However, it was discovered that when this optical element covering member is simply formed, warping and undulation are generated on the optical element covering member itself, and as a result, appearance defects in terms of display performance may occur. For example, when existing optical elements are installed in a display device, such as an LCD-TV, followed by performing a lighting test, heat is generated from a light source, a power source, and a circuit system. As a result, dimensional changes of optical members, which are not united to each other, occur repeatedly in the display device because of thermal expansion and/or humidity change (desiccation and humidification). Hence, the present situation is that the warping is suppressed only by increasing the thicknesses of the above members.

It was discovered that when the members as described above are simply formed into an optical element covering member, the dimensional change of a covering member and that of optical elements which are covered thereby occur independently because of thermal expansion/shrinkage and/or humidity change (desiccation and humidification), and dimensional change behaviors thereof are different from each other. Hence, as a new problem which is caused by the formation of the optical element covering member, the display performance may be degraded because of warping, undulation, and/or the like.

Research was further conducted to suppress the degradation in display performance which is caused by warping, undulation, and/or the like of the optical element covering member. As a result, it was discovered that the degradation in display performance which is caused by warping, undulation, and/or the like of the optical element covering member can be suppressed when a covering member having a Vicat softening point of more than 85° C. is used, and in addition, when the coefficient of thermal expansion of at least one surface of the covering member which covers a support medium is set in the range of 85% to 160% of the coefficient of thermal expansion of the support medium.

The present application is based on the results obtained from the above research.

To this end, according to a first embodiment, there is provided an optical element covering member comprising: at least one optical element; a support medium supporting the optical element; and a covering member covering the optical element and the support medium, wherein the covering member has a Vicat softening point of more than 85° C., and at least one surface of the covering member, which covers the support medium, has a coefficient of thermal expansion in the range of 85% to 160% of the coefficient of thermal expansion of the support medium.

According to a second embodiment, there is provided a backlight comprising: a light source emitting light; and an optical element covering member which improves properties of the light emitted from the light source and which emits the light to a liquid crystal panel, wherein the optical element covering member includes: at least one optical element; a support medium supporting the optical element; and a covering member covering the optical element and the support medium, the covering member has a Vicat softening point of more than 85° C., and at least one surface of the covering member, which covers the support medium, has a coefficient of thermal expansion in the range of 85% to 160% of the coefficient of thermal expansion of the support medium.

According to a third embodiment, there is provided a liquid crystal display device comprising: a light source emitting light; an optical element covering member which improves properties of the light emitted from the light source; and a liquid crystal panel which displays an image based on the light having the properties improved by the optical element covering member, wherein the optical element covering member includes: at least one optical element; a support medium supporting the optical element; and a covering member covering the optical element and the support medium, the covering member has a Vicat softening point of more than 85° C., and at least one surface of the covering member, which covers the support medium, has a coefficient of thermal expansion in the range of 85% to 160% of the coefficient of thermal expansion of the support medium.

According to an embodiment, since the at least one optical element and the support medium are covered by the covering member, the at least one optical element and the support medium can be united together. Hence, insufficient rigidity of the optical element can be compensated for by the support medium.

In addition, since the covering member has a Vicat softening point of more than 85° C., and the at least one surface of the covering member, which covers the support medium, has a coefficient of thermal expansion in the range of 85% to 160% of the coefficient of thermal expansion of the support medium, the generation of warping and/or undulation of the optical element covering member can be suppressed.

As described above, according to an embodiment, while the increase in thickness of the liquid crystal display device and the degradation in display performance thereof are suppressed, insufficient rigidity of the optical element can be improved. In addition, superior display performance can also be stably realized.

Additional features and advantages are described herein, and will be apparent from the following Detailed Description and the figures.

BRIEF DESCRIPTION OF THE DRAWINGS

FIG. 10 is a perspective view showing one structural example of a backlight according to a second embodiment;

FIG. 11 is a perspective view showing one structural example of a backlight according to a third embodiment;

FIGS. 20A and 20B are perspective views each illustrating one example of a method for manufacturing an optical element covering member, according to a seventh embodiment;

DETAILED DESCRIPTION

Figure 1:
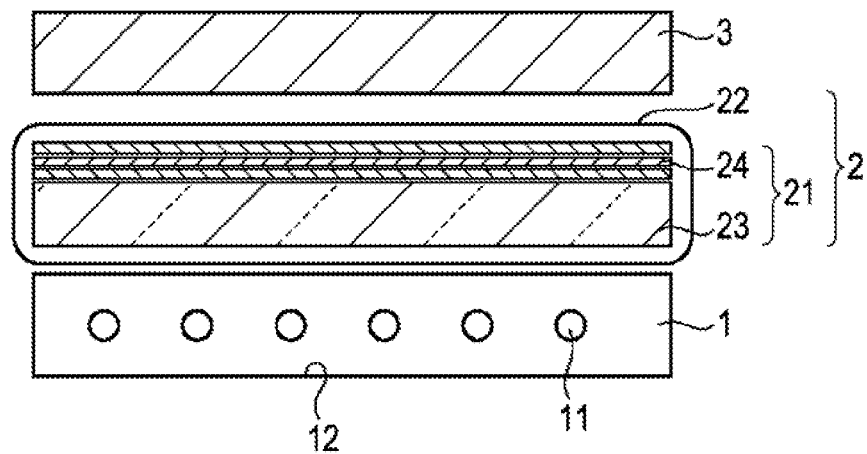
FIG. 1 is a cross-sectional view showing one structural example of a liquid crystal display device according to a first embodiment.

An embodiment will be described with reference to the drawings. In all the figures of the embodiments, the same or the equivalent portions are designated by the same reference numeral.

(1) First Embodiment

1-1 Structure of Liquid Crystal Display Device

FIG. 1 is a cross-sectional view showing one structural example of a liquid crystal display device according to a first embodiment. As shown in FIG. 1, this liquid crystal display device includes a lighting element 1 emitting light, an optical element covering member 2 improving properties of the light emitted from the lighting element 1, and a liquid crystal panel 3 displaying an image based on the light having the properties improved by the optical element covering member 2. The lighting element 1 and the optical element covering member 2 form a backlight. Hereinafter, a surface on which light from the lighting element 1 is incident is called an incident surface, a surface emitting light incident on this incident surface is called a transmission surface, and a surface located between the incident surface and the transmission surface is called an end surface. In addition, the incident surface and the transmission surface are each called a primary surface in some cases.

The lighting element 1 is, for example, a direct-lighting type element and includes at least one light source 11 emitting light and a reflection plate 12 which reflects the light emitted from the light source 11 toward the liquid crystal panel 3. As the light source 11, for example, a cold cathode fluorescent lamp (CCFL), a hot cathode fluorescent lamp (HCFL), an organic electroluminescence (OEL), or a light emitting diode (LED) may be used. The reflection plate 12 is provided, for example, so as to cover the bottom and the side of the light source 11 and so as to reflect light emitted to the bottom side and the lateral side of the at least one light source 11 in the direction toward the liquid crystal panel 3.

The optical element covering member 2 includes, for example, at least one optical element 24 which changes light properties by performing a treatment, such as diffusion or condensation, for light emitted from the lighting element 1, a support medium 23 supporting the optical element 24, and a covering member 22 which units the optical element 24 and the support medium 23 together by covering. Hereinafter, the support medium 23 and the at least one optical element 24 stacked thereto is collectively called an optical element stack 21.

The number and the type of optical elements 24 are not particularly limited and may be optionally selected in accordance with properties of a desired liquid crystal display device. As the optical element 24, for example, an element formed of a support medium and at least one functional layer or an element formed of at least one functional layer may be used. As the optical element 24, for example, light diffusion element, a light condensation element, a reflection type polarizer, a polarizer, and a light division element may be used. As the optical element 24, for example, an element in the form of a film, a sheet, or a plate may be used. The thickness of the optical element 24 is, for example, 5 to 1,000 μm.

The support medium 23 is, for example, a transparent plate transmitting light emitted from the lighting element 1 or an optical plate changing light properties by performing a treatment, such as diffusion or condensation, for light emitted from the lighting element 1. As the optical plate, for example, a diffusion plate, a retardation plate, or a prism plate may be used. The thickness of the support medium 23 is, for example, 1,000 to 50,000 μm. The support medium 23 is formed, for example, of a high molecular weight material or a glass, and the transmittance thereof is preferably 30% or more. In addition, the order of lamination of the optical element 24 and the support medium 23 is determined, for example, in accordance with the functions of the optical element 24 and the support medium 23. For example, when the support medium 23 is a diffusion plate, the support medium 23 is provided at a side on which light emitted from the lighting element 1 is incident, and when the support medium 23 is a reflection type polarizing plate, the support medium 23 is provided at a side from which light is emitted to the liquid crystal panel 3. The shapes of the incident surface and the transmission surface of the optical element 24 and those of the support medium 23 may be selected in accordance with the shape of the liquid crystal panel 3 and are, for example, a rectangular shape in which the ratio (aspect ratio) of the longitudinal length to the lateral length is not 1.

The primary surfaces of the optical element 24 and the support medium 23 are preferably processed by a roughing treatment or are preferably processed to contain fine particles. The reason for this is that rubbing and friction can be decreased. In addition, additives, such as a light stabilizer, a UV absorber, an antistatic agent, a flame retardant, and an antioxidant, may be contained, whenever necessary, in the optical element 24 and the support medium 23 so as to impart a UV absorption function, an infrared absorption function, an antistatic function, and the like to the optical element 24 and the support medium 23. In addition, by performing a surface treatment, such as an antireflection treatment (AR treatment) or an antiglare treatment (AG treatment), for the optical element 24 and the support medium 23, reflection light may be diffused, or reflection light itself may be decreased. In addition, functions of reflecting ultraviolet rays and/or infrared rays may be imparted to the surface of the optical element 24 and that of the support medium 23.

The covering member 22 is, for example, a single-layer or a multilayer film, sheet, plate, or bag having transparent properties. The covering member 22 has, for example, a belt shape, and end surfaces thereof in a longitudinal direction are preferably bonded to each other on an end surface of the optical element stack 21. In addition, hereinafter, among the surfaces of the covering member 22, a surface at the optical element stack 21 side is called an inner surface, and a surface opposite thereto is called an outer surface.

Films or sheets forming the covering member 22 may be bonded together in a longitudinal direction and/or in a direction perpendicular thereto. The films or sheets forming the covering member 22 may cover the optical element stack 21 at least once in at least one predetermined direction. In addition, the covering member 22 may be a continuous film or sheet, and at least two films or sheets may cover the optical element stack 21 in at least one predetermined direction.

When the primary surfaces of the optical element stack 21 have a rectangular shape in which the ratio of the longitudinal length to the lateral length is not 1, the primary surfaces and the two end surfaces at the long length side are covered by the covering member 22, and the two end surfaces at the short length side are exposed from the covering member 22. Alternately, the primary surfaces and the two end surfaces at the short length side are covered by the covering member 22, and the two end surfaces at the long length side are exposed.

The thickness of the covering member 22 is, for example, 5 to 5,000 μm, preferably 10 to 500 μm, and more preferably 30 to 300 μm. In addition, the thickness of the covering member 22 at the incident surface side may be different from that at the transmission surface side, and in this case, the thickness at the incident surface side is preferably larger than that at the transmission surface side. The reason for this is that when the thickness at the incident surface side is set larger, the change in shape of the support medium 23 and that of the optical element 24, caused by heat generated from the light source 11, can be suppressed. In addition, the covering member 22 preferably covers each primary surface of the optical element stack 21 at an area ratio of 50% or more. In addition, the covering member 22 may include a surface structured member as a support medium. The covering member 22 has, for example, the uniaxial anisotropy or the biaxial anisotropy. For example, when the covering member 22 has a rectangular shape, it has an uniaxial anisotropy of positive or negative refractive index properties in the longitudinal direction of the covering member 22 or has a biaxial anisotropy of positive or negative refractive index properties in the longitudinal direction of the covering member 22.

The transmittance of the covering member is preferably in the range of 5% to 95%. Various surface shapes may be formed on the covering member itself in order to obtain anti-scratching properties, resistance against blurring caused by adhesion, and light scattering properties, or the covering member may be formed from inorganic particles, such as TiO2, SiO2, Al2O3, CaCO3, or BaSO4; organic particles, such as poly(methyl methacrylate), polystyrene, poly(vinyl chloride), a fluorinated resin, or a polyester; particles made of the above material and having pores therein; or a material having pores. In addition, at least two resins may be mixed or synthesized together as long as transparency, and/or at least one of anti-scratching properties, adhesion resistance, and light scattering properties can be obtained.

In addition, when the covering member 22 has the anisotropy, the optical anisotropy is preferably small, and in particular, the retardation thereof is preferably 50 nm or less. As the covering member 22, a uniaxially or a biaxially drawn sheet or film is preferably used. When the sheet or the film as described above is used, since the covering member 22 can be shrunk in the direction opposite to the drawing direction by heat application, the adhesion between the covering member 22 and the optical element stack 21 can be improved.

As the covering member 22, for example, a high molecular weight material having transparency may be used. As the high molecular weight material, for example, there may be used a polyolefinic resin, such as polyethylene (PE), polypropylene (PP), or polybutylene (PB); a polyester resin, such as poly (ethylene terephthalate) (PET), poly(ethylene naphthalate) (PEN), poly(butylene terephthalate) (PBT), or poly(butylene naphthalate) (PBN); a polycarbonate (PC) resin; a cycloolefinic resin; a urethane resin; a urea resin; a vinyl-based resin, such as a vinyl chloride-based resin, a natural rubber-based resin, an artificial rubber-based resin, a poly (methyl methacrylate)-based resin, or a polystyrene-based resin; or a block copolymer of a vinyl aromatic hydrocarbon and a conjugated diene, and in particular, a block copolymer of a vinyl aromatic hydrocarbon and a conjugated diene is preferable. In addition, as the high molecular weight material, either a crystalline or a non-crystalline material may be used. The covering member 22 may be formed from at least two materials, and when bonding is performed for covering, for example, thermal welding may be used. For example, after one material is used as a substrate, a layer containing an increased amount of a low molecular weight component may be provided on one surface of the substrate so as to form an easily weldable layer, or alternatively, on one surface of a substrate, a thermoplastic resin or a low molecular weight component as a primer may be provided by molding, coating, or lamination so as to form an adhesive layer.

As described above, the covering member 22 preferably includes a block copolymer of a vinyl aromatic hydrocarbon and a conjugated diene. In addition, when the covering member 22 is formed of a plurality of layers, at least one of the above layers includes a block copolymer of a vinyl aromatic hydrocarbon and a conjugated diene.

As the vinyl aromatic hydrocarbon of the block copolymer, for example, there may be mentioned styrene, o-methyl styrene, p-methyl styrene, 2,4-dimethyl styrene, 2,5-dimethyl styrene, α-methyl styrene, vinyl naphthalene, or vinyl anthracene, and in particular, styrene is generally used.

As the conjugated diene of the block copolymer, for example, 1,3-butadien, 2-methyl-1,3-butadien (isoprene), 2,3-dimethyl-1,3-butadien, or 1,3-pentadiene may be mentioned, and as a particularly common material, 1,3-butadiene or isoprene is mentioned.

The mass ratio of the vinyl aromatic hydrocarbon to the conjugated diene [(vinyl aromatic hydrocarbon): (conjugated diene)] is preferably 95:5 to 5:95, and more preferably, 90:10 to 60:40. The reasons for this are that when the mass ratio of the vinyl aromatic hydrocarbon is less than 5 mass percent, the film rigidity is decreased, and that when the mass ratio is more than 95 mass percent, the surface properties are degraded.

A block rate of the vinyl aromatic hydrocarbon to the conjugated diene is preferably 70% to 90%. The reasons for this are that when the block rate is less than 70 mass percent, the rigidity of the film is degraded, and that when the block rate is more than 90 mass percent, since the surface properties are degraded, the film may not be practically used in some cases. The block rate of the vinyl aromatic hydrocarbon is represented by $(W1/W0) \times 100$, where $W1$ indicates the mass of a block polymer chain of the vinyl aromatic hydrocarbon of the copolymer, and $W0$ indicates the total mass of the vinyl aromatic hydrocarbon of the block copolymer. As for measurement of $W1$, for example, the block copolymer is decomposed using ozone, an obtained vinyl aromatic hydrocarbon polymer component is measured by gel permeation chromatography, a molecular weight corresponding to the chromatogram is obtained from a calibration curve prepared by using the standard polystyrene and styrene oligomer, and a component having a number average molecular weight of more than 3,000 is quantified from the peak area. As a detector, for example, an ultraviolet spectrometer in which measurement is performed at a predetermined wavelength of 254 nm may be used.

A heat-shrinkable film used for a single-layer or multilayer covering member 22 preferably further includes a vinyl aromatic hydrocarbon polymer. The reason for this is that the heat stability, the rigidity, and the adhesion with the optical element 24 can be improved dependent on the material properties of the optical element 24 and/or the structure of the lighting element 1. The vinyl aromatic hydrocarbon polymer used in the first embodiment is at least one type polymer selected from a vinyl aromatic hydrocarbon polymer (a), a copolymer (b) of a vinyl aromatic hydrocarbon and (meth) acrylic acid, a copolymer (c) of a vinyl aromatic hydrocarbon and (meth)acrylic ester, and a rubber-modified styrene-based polymer (d).

As the vinyl aromatic hydrocarbon polymer (a), for example, a homopolymer of one of the above vinyl aromatic hydrocarbons or a copolymer of at least two thereof may be used. In particular, as a common polymer, polystyrene may be mentioned.

The copolymer (b) of a vinyl aromatic hydrocarbon and (meth)acrylic acid is obtained, for example, by polymerizing the vinyl aromatic hydrocarbon as described above and (meth)acrylic acid, and for polymerization, at least one type compound may be used for each monomer. As (meth)acrylic acid, for example, acrylic acid and methacrylic acid may be mentioned.

The copolymer (c) of a vinyl aromatic hydrocarbon and (meth)acrylic ester is obtained, for example, by polymerizing the vinyl aromatic hydrocarbon as described above and (meth)acrylic ester, and for polymerization, at least one type compound may be used for each monomer. As the (meth) acrylic ester, for example, methyl acrylate, ethyl acrylate, butyl acrylate, methyl methacrylate, ethyl methacrylate, and butyl methacrylate may be mentioned.

The copolymer (b) or (c) is obtained by polymerizing monomer mixture in which the mass ratio of the vinyl aromatic hydrocarbon to (meth)acrylic acid or (meth)acrylic ester is preferably 5:95 to 95:5 and more preferably 70:30 to 99:1.

The rubber-modified styrene-based polymer (d) is obtained, for example, by polymerizing a mixture containing at least one of various elastomers and at least one of a vinyl aromatic hydrocarbon and a monomer copolymerizable therewith. As the vinyl aromatic hydrocarbon, the vinyl aromatic hydrocarbon as described for the above block copolymer is used, and as the monomer copolymerizable therewith, for example, (meth)acrylic acid, (meth)acrylic ester, or acrylonitrile may be mentioned. In addition, as the elastomers, for example, a butadiene rubber, a styrene-butadiene rubber, and a chloroprene rubber may be mentioned. In particular, a high impact rubber-modified styrene resin (HIPS) is preferably used.

When the block copolymer and the vinyl aromatic hydrocarbon polymer are blended together for use, the mass ratio of the block copolymer to the vinyl aromatic hydrocarbon polymer is preferably 100:0 to 50:50. The reason for this is that when the mass ratio of the block copolymer is less than 50 mass percent, heat shrinkability of the film is insufficient.

When the film used for the first embodiment is formed of a plurality of layers (a multilayer film), at least one layer thereof includes the block copolymer as a component with or without the vinyl aromatic hydrocarbon polymer, and layers other than that described above, which do not contain the above component, may not be particularly limited as long as they are formed of a styrene-based polymer. As the styrene-based polymer, for example, the styrene-butadiene block copolymer as described as the vinyl aromatic hydrocarbon polymer, the aforementioned vinyl aromatic hydrocarbon polymers, an ABS resin, and a styrene-acrylonitrile copolymer may be mentioned. The above resins and the polymers may be used alone or in combination. In particular, a styrene-butadiene copolymer, which is different from a styrene-butadiene copolymer used in the at least one layer containing the block copolymer as a component, or the aforementioned vinyl aromatic hydrocarbon polymer is preferable.

The Vicat softening point of the covering member 22 is more than 85° C., and the rate ((B/A)×100) of a coefficient of thermal expansion B of the covering member 22 to a coefficient of thermal expansion A of the support medium 23 is 85% to 160%.

It has been empirically confirmed that as for the temperature inside a backlight when a TV is mounted, the surface temperature of a diffusion plate is generally increased to approximately 65° C. when measurement is performed at room temperature, and that the surface temperature of the diffusion plate inside the backlight when a TV is mounted is increased to approximately more than 80° C. under usage conditions at a high temperature of 45° C., and hence the Vicat softening point is preferably more than 85° C. in order to sufficiently withstand the environmental temperature described above.

In the case in which the rate ((B/A)×100) of the coefficient of thermal expansion B of the covering member 22 to the coefficient of thermal expansion A of the support medium 23 is set to less than 85%, when the optical element covering member 2 is mounted and humidified in a TV, although it is flat at room temperature, the amount of change in thermal expansion of the support medium 23 relative to the amount of change in thermal expansion of the covering member 22 is excessively increased, and because of the expansion of the support medium 23, warping and deformation of the optical element covering member 2 unfavorably start to occur. When warping occurs, since the pressure is applied to a liquid crystal display portion and/or a chassis member receiving the liquid crystal display portion, the liquid crystal display performance is degraded, and as a result, defects are generated such that a whitish image is displayed when a black image is to be displayed. Hence, the rate ((B/A)×100) of the coefficient of thermal expansion B of the covering member 22 to the coefficient of thermal expansion A of the support medium 23 is preferably set to 85% or more.

In addition, when the rate ((B/A)×100) of the coefficient of thermal expansion B of the covering member 22 to the coefficient of thermal expansion A of the support medium 23 is set to more than 160%, since the amount of change in thermal expansion of the covering member 22 relative to the amount of change in thermal expansion of the support medium 23 is excessively increased, the covering member 22 is liable to sag, and because of the undulation generated thereby, luminance irregularities are unfavorably generated. Hence, the rate ((B/A)×100) of the coefficient of thermal expansion B of the covering member 22 to the coefficient of thermal expansion A of the support medium 23 is preferably set to 160% or less.

The heat distortion temperature of the covering member 22 is preferably 90° C. or more. The reason for this is that degradation in optical properties of the optical element covering member 2, which is caused by heat generated from the light source 11, can be suppressed. The amount of a material forming the covering member 22, which is reduced by drying, is preferably 2% or less. The coefficient of thermal expansion of the covering member 22 is preferably smaller than that of the support medium 23 and the optical element 24, which are covered by the covering member 22. The reason for this is that the adhesion between the covering member 22 and the optical element stack 21 can be enhanced. A material for the covering member 22 preferably has a refractive index (refractive index of the covering member 22) of 1.6 or less, and more preferably 1.55 or less.

In addition, whenever necessary, the covering member 22 may further contain additives, such as a light stabilizer, a UV absorber, an antistatic agent, a flame retardant, and an antioxidant, so as to obtain a UV absorption function, an IR absorption function, an antistatic function, and the like. In addition, by performing a surface treatment, such as an anti-reflection treatment (AR treatment) or an antiglare treatment (AG treatment) for the covering member 22, the reflection light may be diffused, or the reflection light itself may be decreased. Furthermore, a function to transmit light in a specific wavelength region, such as UV-A light (approximately 315 to 400 nm), may be imparted.

The liquid crystal panel 3 is a panel to control light supplied from the light source 11 and to display information. As an operation mode of the liquid crystal panel 3, for example, there may be mentioned a twisted nematic (TN) mode, a vertically aligned (VA) mode, an in-plane switching (IPS) mode, or an optically compensated birefringence (OCB) mode.

Next, with reference to FIGS. 2 to 4, a structural example of the optical element covering member 2 will be described in detail.

Figure 2:
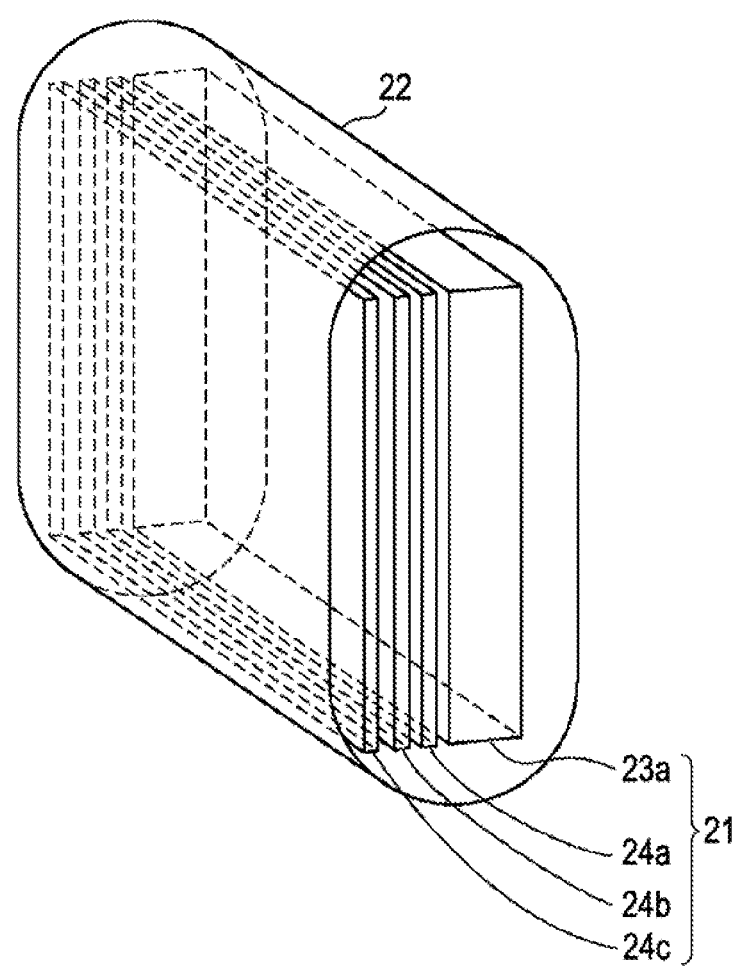
FIG. 2 is a perspective view showing a first structural example of an optical element covering member according to the first embodiment.

FIG. 2 shows a first structural example of an optical element covering member according to the first embodiment. As shown in FIG. 2, the optical element covering member 2 has, for example, a diffusion plate 23a used as a support medium, a diffusion film 24a, a lens film 24b, and a reflection type polarizer 24c, the latter three each being used as an optical element, and also has the covering member 22 which units the elements described above together by covering. In this embodiment, the diffusion plate 23a, the diffusion film 24a, the lens film 24b, and the reflection type polarizer 24c form the optical element stack 21. The primary surfaces of the optical element stack 21 each have, for example, a rectangular shape in which the ratio of the longitudinal length to the lateral length is not 1. The primary surfaces of the optical element stack 21 and the two end surfaces thereof at the long length side are covered by the covering member 22 having a belt shape, and the two end surfaces at the short length side of the optical element stack 21 are exposed. Two edge portions of the sheet-shaped covering member 22 in the longitudinal direction are bonded to each other, for example, at one end surface of the optical element stack 21 at the long length side.

The diffusion plate 23a is provided above the at least one light source 11 and is a plate to uniform the luminance by diffusing light emitted from the at least one light source 11 and reflection light reflected from the reflection plate 12. As the diffusion plate 23a, for example, there may be used a plate having an irregular structure on the surface thereof to diffuse light, a plate which includes fine particles having a different refractive index from that of a primary structural material for the diffusion plate 23a, a plate including hollow fine particles, or a plate including at least two of the above irregular structure, fine particles, and hollow fine particles in combination. As the fine particles, for example, at least one type of organic fillers and inorganic fillers may be used. In addition, the above irregular structure, fine particles, and hollow fine particles are provided, for example, on a transmission surface of the diffusion plate 23a. The light transmittance of the diffusion plate 23a is, for example, 30% or more.

The diffusion film 24a is provided on the diffusion plate 23a and is a film, for example, to diffuse light diffused by the diffusion plate 23a. As the diffusion film 24a, for example, there may be used a film having an irregular structure on the surface thereof to diffuse light, a film which includes fine particles having a different refractive index from that of a primary structural material for the diffusion film 24a, a film including hollow fine particles, or a film including at least two of the above irregular structure, fine particles, and hollow fine particles in combination. As the fine particles, for example, at least one type of organic fillers and inorganic fillers may be used. In addition, the above irregular structure, fine particles, and hollow fine particles are provided, for example, on a transmission surface of the diffusion film 24a.

The lens film 24b is provided on the diffusion film 24a and is a film, for example, to improve the directivity of irradiated light. On a transmission surface of the lens film 24b, for example, fine prism lens lines are provided, the cross-section of this prism lens in the line direction has, for example, an approximately triangle shape, and the peak thereof preferably has a round shape. The reason for this is that the cut-off can be improved and the viewing angle can be increased.

The diffusion film 24a and the lens film 24b are each formed, for example, of a high molecular weight material, and the refractive index thereof is, for example, 1.5 to 1.6. As a material forming the optical element 24 and an optical functional layer provided thereon, for example, a photosensitive resin which is cured by light or electron beams or a thermosetting resin which is cured by heat is preferable, and a UV curable resin which is cured by ultraviolet rays is most preferable.

The reflection type polarizer 24c is provided on the lens film 24b and is a polarizer which transmits only one of two polarized components perpendicular to each other of light, the directivity thereof being enhanced by the lens sheet, and which reflects the other polarized component. The reflection type polarizer 24c is a stack composed, for example, of an organic multilayer film, an inorganic multilayer film, or a liquid-crystal multilayer film. In addition, the reflection type polarizer 24c may include different refractive index materials. In addition, the reflection type polarizer 24c may be provided with a diffusion lens.

Figure 3:
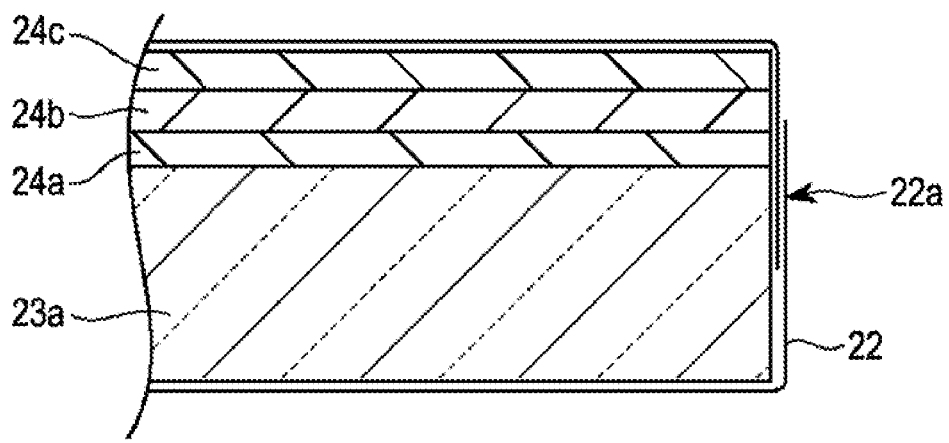
FIG. 3 is a cross-sectional view showing a first example of a bond portion of a covering member according to the first embodiment.
Figure 4:
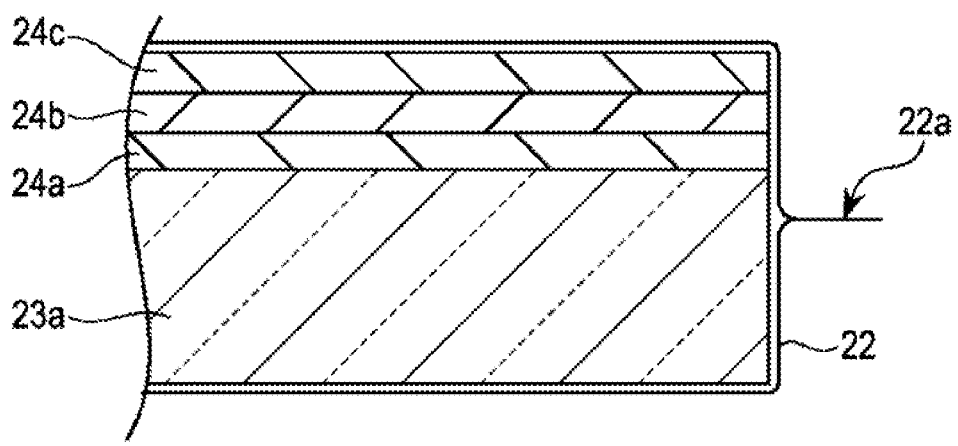
FIG. 4 is a cross-sectional view showing a second example of the bond portion of the covering member according to the first embodiment.

With reference to FIGS. 3 and 4, an example of a bond portion of the covering member 22 will be described.

FIG. 3 shows a first example of the bond portion of the covering member. According to this first example, as shown in FIG. 3, an inside surface and an outside surface of the edge portions of the covering member are bonded to each other on one end surface of the optical element stack 21 so as to be overlapped with each other. That is, the edge portions of the covering member 22 are bonded together so as to be along the end surface of the optical element stack 21.

FIG. 4 shows a second example of the bond portion of the covering member. According to this second example, as shown in FIG. 4, inside surfaces of the edge portions of the covering member are bonded to each other at one end surface of the optical element stack 21 so as to be overlapped with each other. That is, the edge portions of the covering member 22 are bonded together so as to be erected from the end surface of the optical element stack 21.

Figure 5:
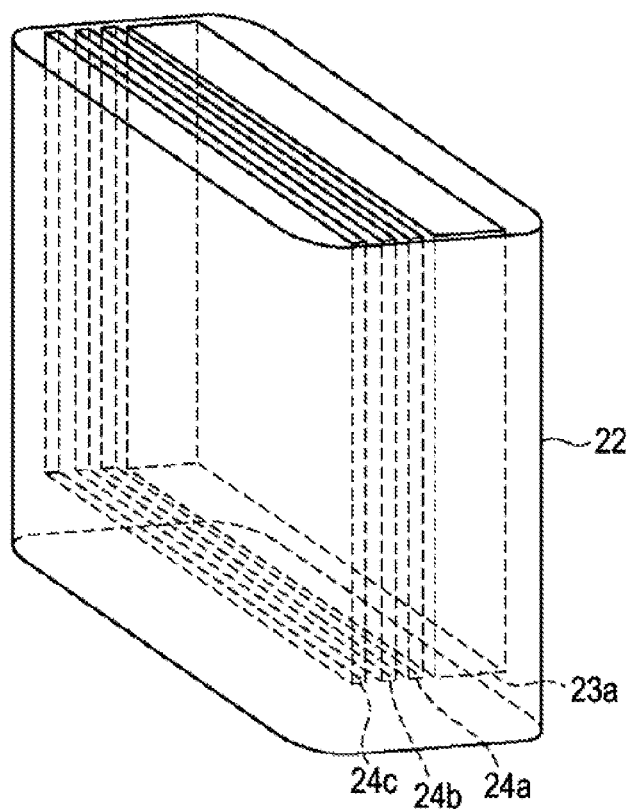
FIG. 5 is a perspective view showing a second structural example of the optical element covering member according to the first embodiment.

FIG. 5 shows a second structural example of the optical element covering member according to the first embodiment. As shown in FIG. 5, the incident surface, the transmission surface, and the two end surfaces at the short length side of the optical element stack 21 are covered by the sheet-shaped covering member 22, and the two end surfaces of the optical element stack 21 at the long length side are exposed. The edge portions of the sheet-shaped covering member 22 in the longitudinal direction are bonded to each other at one end surface of the optical element stack 21 at the short length side.

Figure 6:
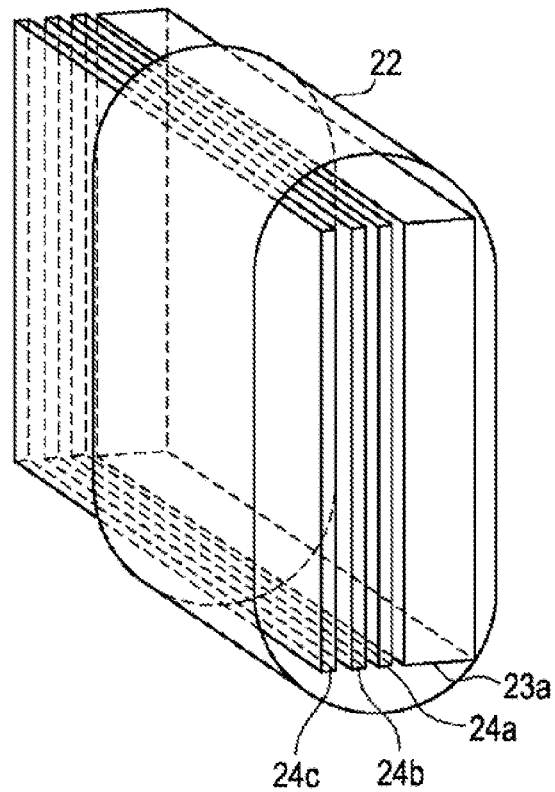
FIG. 6 is a perspective view showing a third structural example of the optical element covering member according to the first embodiment.

FIG. 6 shows a third structural example of the optical element covering member according to the first embodiment. As shown in FIG. 6, the central portion of the optical element stack 21 and the vicinity thereof are covered by the sheet-shaped covering member 22, and two edge portions of the optical element stack 21 at the short length side are exposed. The edge portions of the sheet-shaped covering member 22 in the longitudinal direction are bonded together at one end surface of the optical element stack 21 at the long length side.

1-2-Method for Manufacturing Optical Element Covering Member

Next, with reference to FIGS. 7A to 9B, one example of a method for manufacturing an optical element covering member having the above structure will be described.

Method for Manufacturing Covering Member

First, one example of a method for manufacturing the covering member used in the first embodiment will be described. According to the method for manufacturing the covering member of this first embodiment, in the case of a single layer film, for example, a single layer film is manufactured using a die or a feedblock by one extruder. In the case of a multilayer film, for example, resin materials as described above, which are prepared for individual layers, are molten by respective extruders and are then formed into a multilayer film using a die or a feedblock. After the film is formed, it is processed by uniaxial, biaxial, or a multiaxial drawing, or is not processed by drawing. As the die, a known die, such as a T die or a circular die, may be used. As a drawing method, for example, a method may be mentioned in which an extruded film is drawn in a direction perpendicular to the extrusion direction and/or in the extrusion direction using a tenter. In addition, for example, a method may also be mentioned in which an open-ended tubular shaped film extruded by an open-ended tubular shaping method is drawn in the circumferential direction or in the extrusion direction.

The drawing temperature is preferably in the range of 60 to 120° C. The reasons for this are that when the temperature is less than 60° C., the film is broken during drawing and that when the temperature is more than 120° C., superior shrinkability may not be obtained.

Although being not particularly limited, the drawing magnification is preferably in the range of 1 to 8 times. When the drawing magnification is 1 time, that is, even when intentional drawing is not performed, desired shrinkage may be obtained in some cases because of shear generated by an extruder. In addition, when the drawing magnification is more than 8 times, since the drawing may not be easily performed, thickness irregularity is liable to be generated.

Step of Covering Optical Element Stack

Figure 7A:
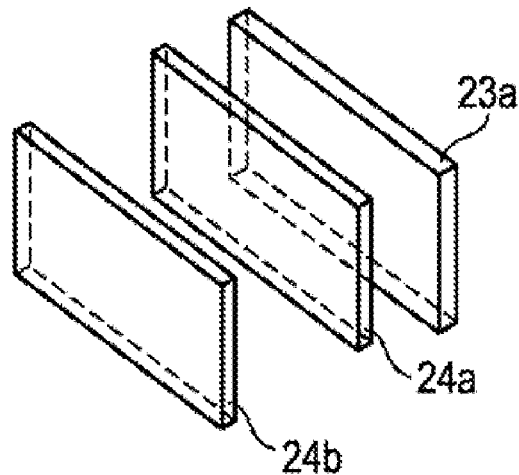
FIGS. 7A and 7B are perspective views each illustrating one example of a method for manufacturing the optical element covering member according to the first embodiment.

First, as shown in FIG. 7A, the diffusion plate 23a used as a support medium, the diffusion film 24a, and the lens film 24b, those films being optical elements, are prepared. Next, for example, the diffusion plate 23a, the diffusion film 24a, and the lens film 24b are stacked to each other in that order, so that the optical element stack 21 is obtained.

Figure 7B:
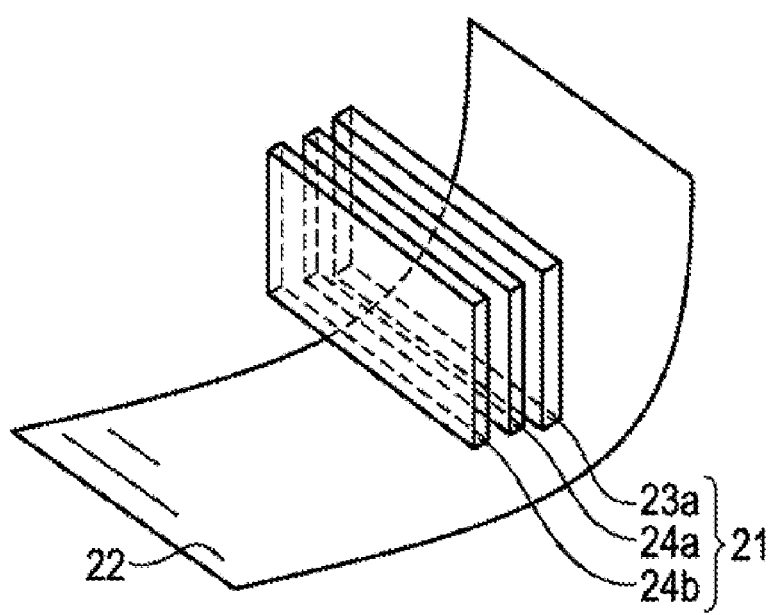
Figure 8A:
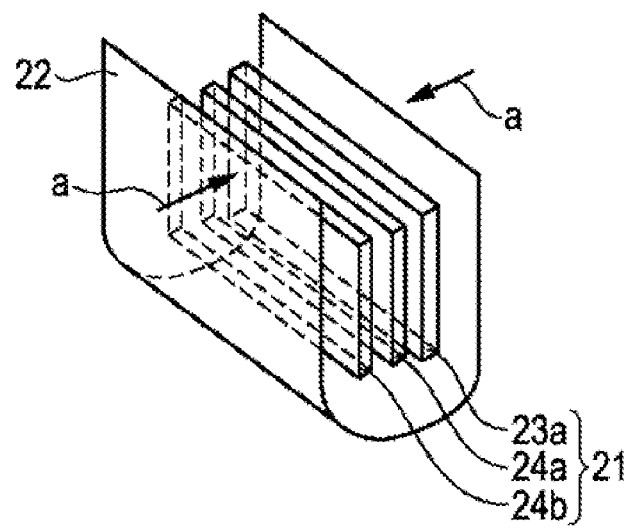
FIGS. 8A and 8B are perspective views each illustrating one example of the method for manufacturing the optical element covering member according to the first embodiment.
Figure 8B:
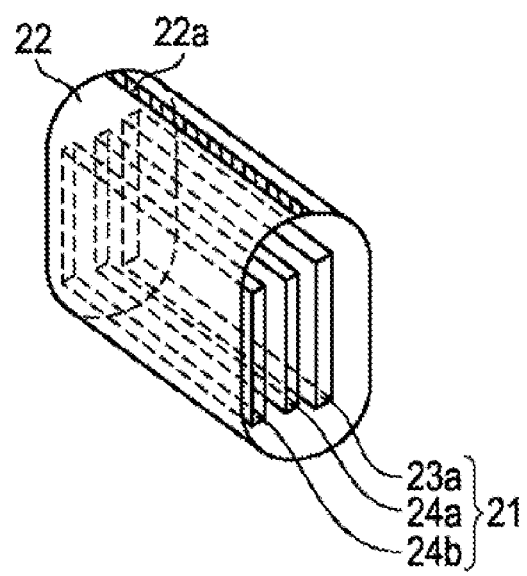

Next, as shown in FIG. 7B, the optical element stack 21 is placed on the covering member 22 formed, for example, of a shrinkable polyester film. Next, as shown by arrows a in FIG. 8A, the edge portions of the covering member 22 in the longitudinal direction are pulled up, and the optical element stack 21 is covered so that the above edge portions are overlapped with each other. Subsequently, as shown in FIG. 8B, the edge portions of the covering member 22 in the longitudinal direction are bonded to each other, for example, at one end surface of the optical element stack 21. As a bonding method, for example, adhesion by an adhesive or welding may be mentioned. As the adhesion method using an adhesive, for example, a hot-melt adhesion method, a thermosetting adhesion method, a pressure-sensitive (tacky adhesive) adhesion method, an energy ray curing adhesion method, or a hydration adhesion method may be mentioned. As the adhesion method by welding, for example, hot welding, ultrasonic welding, or laser welding may be mentioned. By the methods described above, the optical element stack 21 is covered by the covering member 22 having an open-ended tubular shape.

Subsequently, whenever necessary, an excessive bond portion is removed by cutting. Next, by performing a heat treatment for the covering member 22 using a heating furnace or the like, the covering member 22 is preferably heat-shrunk. The reasons for this are that the adhesion between the optical element stack 21 and the covering member 22 can be improved and, in addition, that optical members forming the optical element stack 21 can be more tightly bundled together.

Figure 9A:
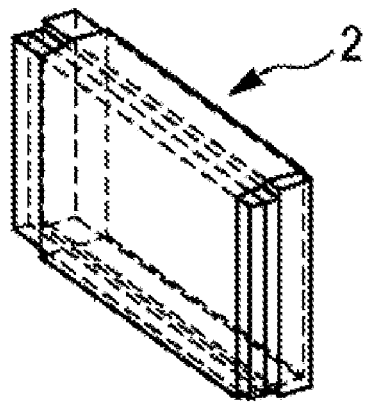
FIGS. 9A and 9B are perspective views each illustrating one example of the method for manufacturing the optical element covering member according to the first embodiment.
Figure 9B:
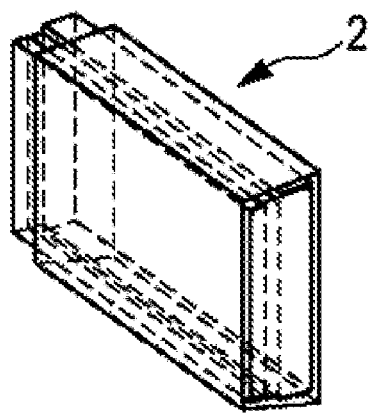

Hence, as shown in FIG. 9A, the intended optical element covering member 2 is obtained in which the four directions of the optical element stack 21 are closed. In addition, as shown in FIG. 9B, at least one open end of the optical element covering member 2 may also be covered.

In this first embodiment described above, since the at least one optical element 24 and the support medium 23 are covered by the covering member 22, the at least one optical element 24 and the support medium 23 can be united together. As a result, while the increase in thickness of a liquid crystal display device or the degradation in display performance thereof is suppressed, insufficient rigidity of the optical element 24 can be improved.

In addition, since the Vicat softening point of the covering member 22 is set to more than 85° C., and the rate ((B/A)× 100) of the coefficient of thermal expansion B of the covering member 22 to the coefficient of thermal expansion A of the support medium 23 is set in the range of 85% to 160%, the generation of warping and undulation of the optical element covering member 2 can be suppressed. Accordingly, superior display performance can be stably realized.

(2) Second Embodiment

According to a second embodiment, some or all of the at least one optical element 24 of the first embodiment is provided outside the optical element covering member 2. The optical element 24 provided outside the optical element covering member 2 is disposed, for example, between the optical element covering member 2 and the liquid crystal panel 3 and/or between the optical element covering member 2 and the lighting element 1. In addition, for example, the optical element 24 provided outside the optical element covering member 2 may be bonded to the transmission surface or the incident surface of the optical element covering member by an adhesive or the like. As the optical element 24 provided outside the optical element covering member 2, for example, a light diffusion element, a light condensation element, a reflection type polarizer, a polarizer, or a light division element may be used.

FIG. 10 shows one structural example of a backlight according to the second embodiment. As shown in FIG. 10, from the lighting element 1 to the liquid crystal panel 3, for example, the optical element covering member 2 and the reflection type polarizer 24c used as an optical element are provided in that order. In the optical element covering member 2, the diffusion plate 23a, the diffusion film 24a, and the lens film 24b are united together by the covering member 22.

In this second embodiment, since the optical element 24, such as a reflection type polarizer, is provided outside the optical element covering member 2, without changing polarization of light emitted from the optical element 24, such as a reflection type polarizer, the light can enter the liquid crystal panel 3.

(3) Third Embodiment

According to a third embodiment, a surface structured member and an optical functional layer are provided on at least one of the inner and the outer surfaces of the covering member 22 of the first embodiment. This optical functional layer is provided, for example, on at least one of the incident surface side and the transmission surface side of the optical element covering member 2. The surface structured member and the optical functional layer are provided to improve the properties of light incident from the lighting element 1. As the surface structured member, for example, various lenses, such as a cylindrical lens, a prism lens, and a fly-eye lens, may be used. In addition, a wobble may be provided for the surface structured member, such as a cylindrical lens or a prism lens. This surface structured member is formed, for example, by a melt extrusion method or a thermal transfer method. As the optical functional layer, for example, an ultraviolet (UV) cut functional layer or an infrared (IR) cut functional layer may be used.

FIG. 11 shows one structural example of a backlight according to the third embodiment. As shown in FIG. 11, from the lighting element 1 to the liquid crystal panel 3, for example, the diffusion plate 23a, the diffusion film 24a, the lens film 24b, and the reflection type polarizer 24c are provided in that order. In addition, the diffusion plate 23a is covered by the covering member 22, and on part of the inner surface of the covering member 22, which is to be used as the incident side, a surface structured member 25 having a brightness-irregularity-reducing function or the like is provided.

In this third embodiment, since the surface structured member and the optical functional layer are provided on at least one of the inner surface and the outer surface of the covering member 22, the number of the optical elements covered by the covering member 22 can be decreased. Hence, the thickness of the optical element covering member 2 and that of a liquid crystal display device can be further decreased.

(4) Fourth Embodiment

According to a fourth embodiment, all directions of the optical element stack 21 of the first embodiment are closed by the covering member 22.

Hereinafter, with reference to FIGS. 12A to 14B, one example of a method for manufacturing an optical element covering member according to the fourth embodiment will be described.

Figure 12A:
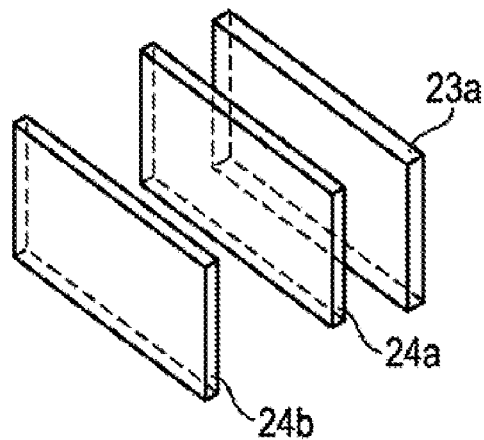
FIGS. 12A and 12B are perspective views each illustrating one example of a method for manufacturing an optical element covering member according to a fourth embodiment.

First, as shown in FIG. 12A, for example, the diffusion plate 23a used as a support medium, the diffusion film 24a, and the lens film 24b, the latter two films being optical elements, are prepared. Next, for example, the diffusion plate 23a, the diffusion film 24a, and the lens film 24b are stacked to each other in this order, so that the optical element covering member 2 is obtained.

Figure 12B:
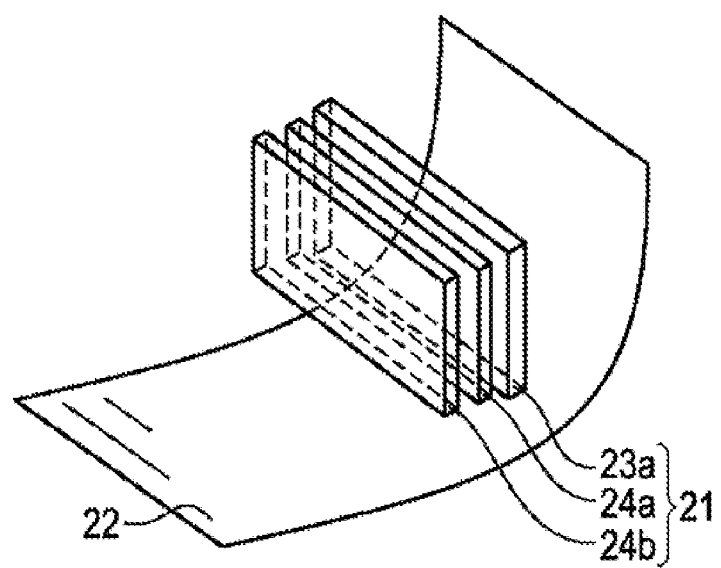
Figure 13A:
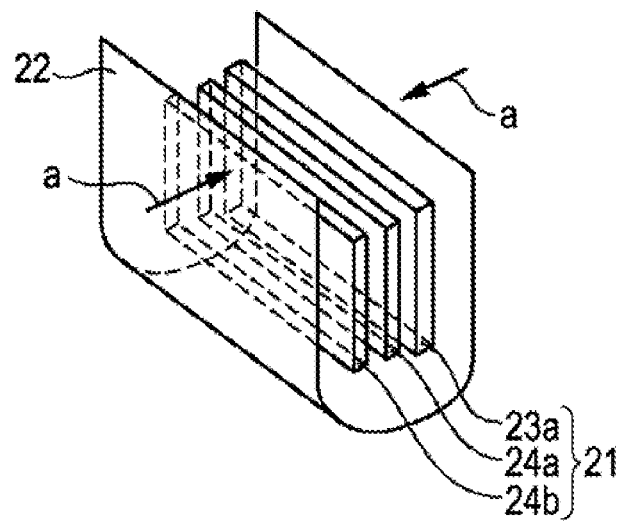
FIGS. 13A and 13B are perspective views each illustrating one example of the method for manufacturing the optical element covering member according to the fourth embodiment.
Figure 13B:
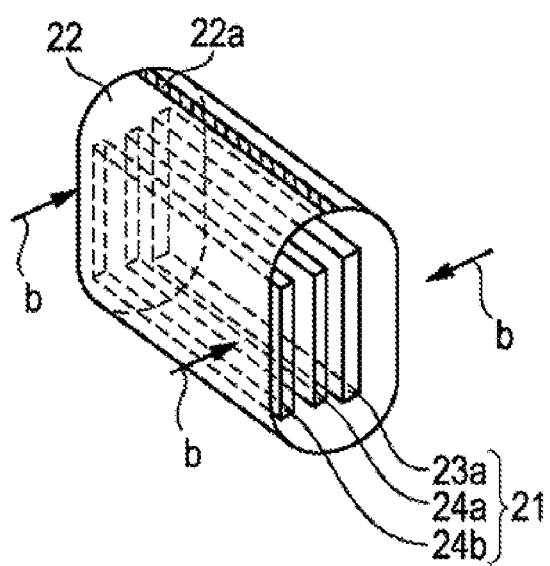

Subsequently, as the covering member 22, a shrinkable biaxial drawn film or a shrinkable biaxial drawn sheet, which has, for example, a belt shape, is prepared. Next, as shown in FIG. 12B, the optical element stack 21 is placed on this covering member 22. Then, as shown by arrows a in FIG. 13A, the edge portions of the covering member 22 in the longitudinal direction are pulled up, and the optical element stack 21 is covered so the edge portions of the covering member 22 in the longitudinal direction are brought into contact with each other. Next, as shown in FIG. 13B, the edge portions of the covering member 22 in the longitudinal direction are bonded together, for example, at one end surface of the optical element stack 21. As a bonding method, for example, a method similar to that of the above first embodiment may be used.

Accordingly, the optical element stack 21 is covered by the covering member 22 having an open-ended tubular shape.

Figure 14A:
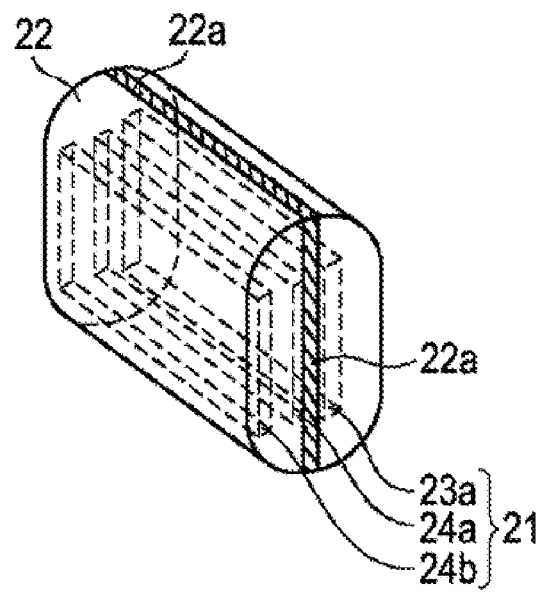
FIGS. 14A and 14B are perspective views each illustrating one example of the method for manufacturing the optical element covering member according to the fourth embodiment.

Subsequently, as shown by arrows b in FIG. 13B, open ends of the covering member 22 having an open-ended tubular shape are each closed by applying a force thereto so that approximately a half of each periphery of the open end is overlapped with the other approximately half thereof. Next, as shown in FIG. 14A, the half periphery and the other half periphery overlapped therewith are bonded to each other. As a bonding method, for example, a method similar to that in the above first embodiments may be used. Next, whenever necessary, an excessive bond portion is removed by cutting. Next, by performing a heat treatment for the covering member 22 using a heating furnace or the like, the covering member 22 is preferably heat-shrunk. The reasons for this are that the adhesion between the optical element stack 21 and the covering member 22 can be improved and, in addition, that optical members forming the optical element stack 21 can be more tightly bundled together.

Figure 14B:
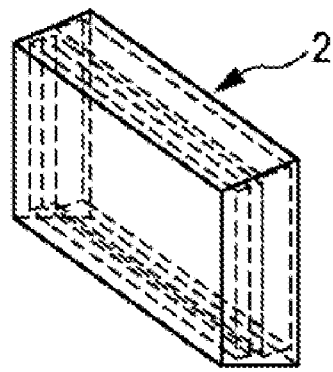

Hence, as shown in FIG. 14B, the intended optical element covering member 2 is obtained in which all the directions of the optical element stack 21 are closed.

(5) Fifth Embodiment

According to a fifth embodiment, fine particles are contained in the covering member 22 of the first embodiment.

Figure 15:
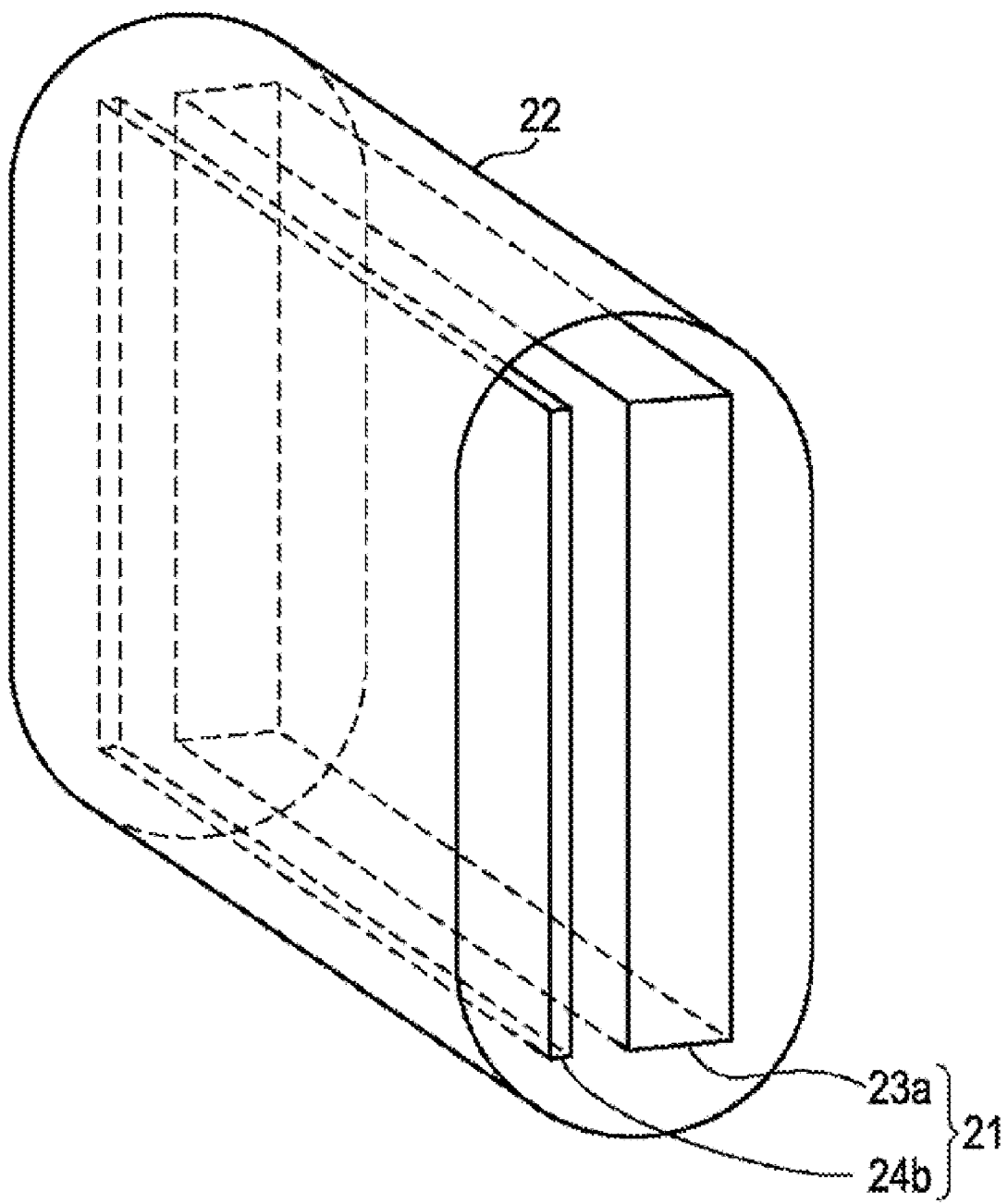
FIG. 15 is a perspective view showing a first structural example of an optical element covering member according to a fifth embodiment.

FIG. 15 shows one example of the structure of an optical element covering member according to the fifth embodiment. As shown in FIG. 15, for example, the optical element covering member 2 includes the diffusion plate 23a used as a support medium, the lens film 24b used as an optical element, and the covering member 22 which unites the above two by covering. In this embodiment, the diffusion plate 23a and the lens film 24b form the optical element stack 21. The primary surface of the optical element stack 21 has, for example, a rectangular shape in which the ratio of the longitudinal length to the lateral length is not 1. The primary surfaces of the optical element stack 21 and the two end surfaces at the long length side are covered by the sheet-shaped covering member 22, and the two end surfaces of the optical element stack 21 at the short length sides are exposed. The two edge portions of the sheet-shaped covering member 22 in the longitudinal direction are bonded to each other at one end surface of the optical element stack 21 at the long length side.

The covering member 22 contains at least one type of fine particles. As the fine particles, for example, at least one type of organic fine particles and inorganic fine particles may be used. As a material for the organic fine particles, for example, at least one type selected from the group consisting of an acrylic resin, a styrene resin, a fluorinated resin, and a hollow resin may be used. As a material for the inorganic particles, for example, at least one type selected from the group consisting of silica, alumina, talc, titanium oxide, and barium sulfate may be used. As the shape of the fine particles, various shapes, such as a needle, a sphere, an oval, a plate, and a scale, may be used. As the diameter of the fine particles, for example, at least one diameter may be selected.

Hereinafter, with reference to FIGS. 16A to 17B, one example of a method for manufacturing an optical element covering member having the above structure will be described.

Figure 16A:
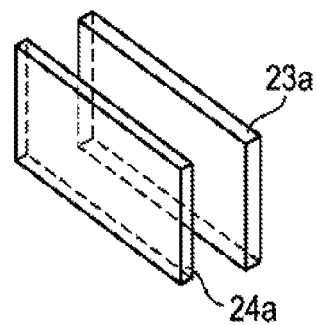
FIGS. 16A, 16B, and 16C are perspective views each illustrating one example of a method for manufacturing the optical element covering member according to the fifth embodiment.

First, as shown in FIG. 16A, for example, the diffusion plate 23a used as a support medium and the lens film 24b used as an optical element are prepared. Next, for example, the diffusion plate 23a and the lens film 24b are stacked together to form the optical element stack 21.

Figure 16B:
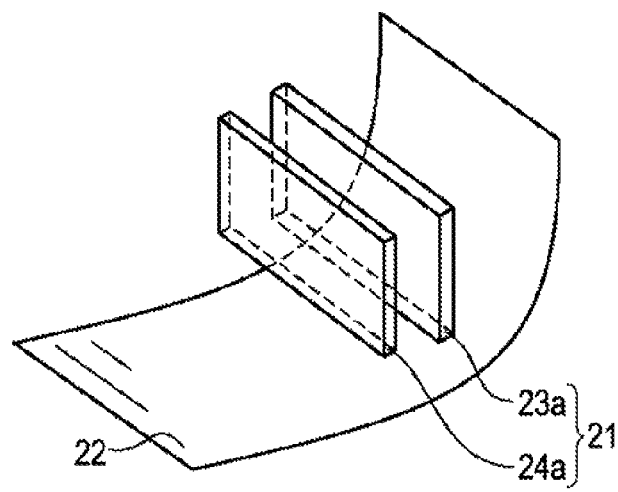
Figure 16C:
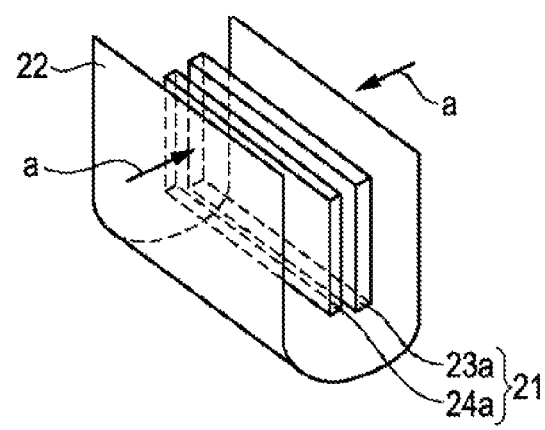
Figure 17A:
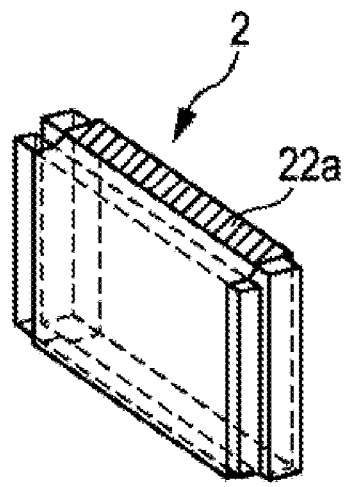
FIGS. 17A and 17B are perspective views each illustrating one example of the method for manufacturing the optical element covering member according to the fifth embodiment.
Figure 17B:
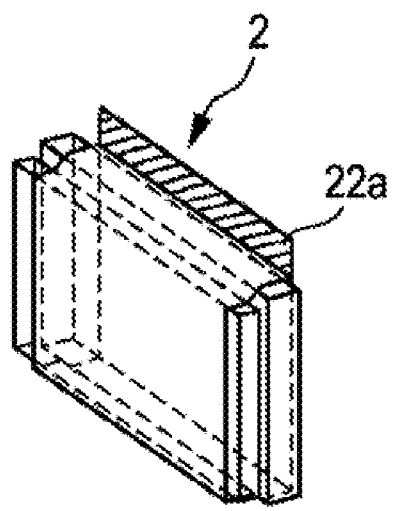

Next, as shown in FIG. 16B, the optical element stack 21 is placed on the covering member 22 composed of a shrinkable polyester film or the like. Subsequently, as shown by arrows a shown in FIG. 16C, the edge portions of the covering member 22 in the longitudinal direction are pulled up, and the optical element stack 21 is covered so the edge portions of the covering member 22 in the longitudinal direction are brought into contact with each other. Next, the edge portions of the covering member 22 in the longitudinal direction are bonded together, for example, at one end surface of the optical element stack 21. As a bonding method, for example, a method similar to that of the above first embodiment may be used. In addition, as shown in FIG. 17A, the edge portions of the covering member 22 in the longitudinal direction may be bonded together within one end surface of the optical element stack 21, or as shown in FIG. 17B, the edge portions of the covering member 22 in the longitudinal direction may be bonded together outside one end surface of the optical element stack 21.

Accordingly, the optical element stack 21 is covered by the covering member 22 having an open-ended tubular shape.

Next, whenever necessary, an excessive bond portion is removed by cutting. Subsequently, by performing a heat treatment for the covering member 22 using a heating furnace or the like, the covering member 22 is preferably heat-shrunk. The reasons for this are that the adhesion between the optical element stack 21 and the covering member 22 can be improved and, in addition, that optical members forming the optical element stack 21 can be more tightly bundled together.

As a result, the intended optical element covering member 2 is obtained in which the four directions of the optical element stack 21 are closed.

In this fifth embodiment, since the covering member 22 contains fine particles, light scattering properties can be imparted to the covering member 22. Hence, the number of the optical elements 24 covered by the covering member 22 can be decreased. Accordingly, the thickness of the optical element covering member 2 and that of a liquid crystal display device can be further decreased.

(6) Sixth Embodiment

According to a sixth embodiment, the covering member 22 having a seamless tube shape is used in the first embodiment.

Hereinafter, with reference to FIGS. 18A to 19B, one example of a method for manufacturing an optical element covering member according to the sixth embodiment will be described.

Figure 18A:
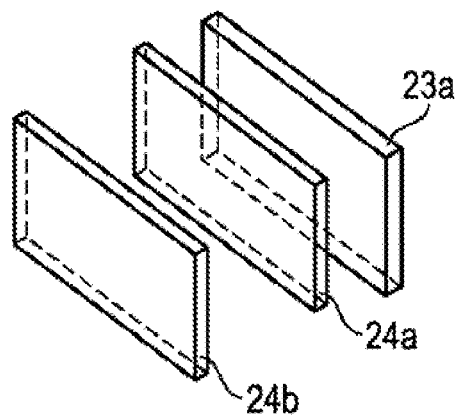
FIGS. 18A and 18B are perspective views each illustrating one example of a method for manufacturing an optical element covering member according to a sixth embodiment.

First, as shown in FIG. 18A, for example, the diffusion plate 23a used as a support medium, the diffusion film 24a, and the lens film 24b, those latter two films being optical elements, are prepared. Next, for example, the diffusion plate 23a, the diffusion film 24a, and the lens film 24b are stacked to each other in that order to form the optical element stack 21.

Figure 18B:
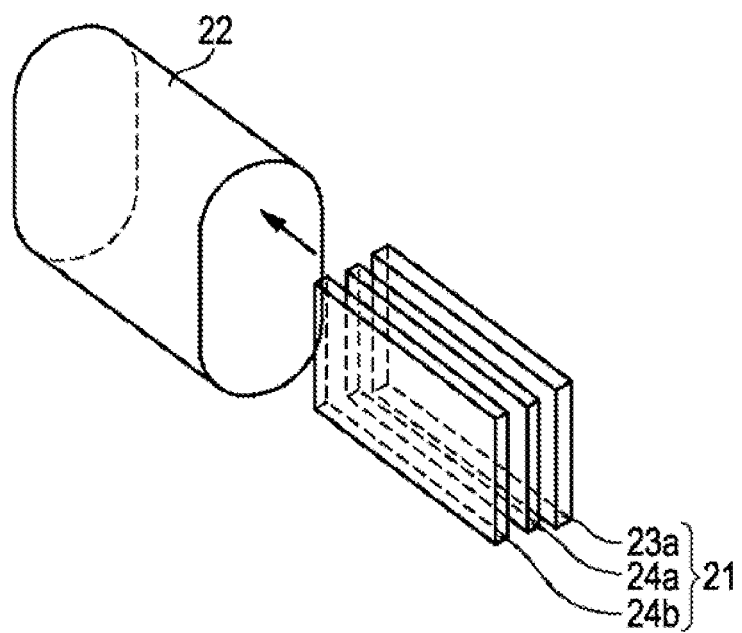
Figure 19A:
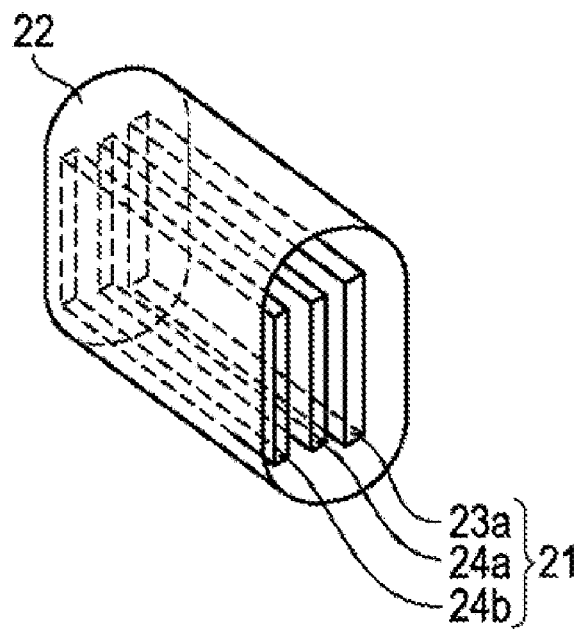
FIGS. 19A and 19B are perspective views each illustrating one example of the method for manufacturing the optical element covering member according to the sixth embodiment.

Next, as shown in FIG. 18B, the optical element stack 21 is inserted in the open-ended tubular shaped covering member 22. As a method for manufacturing the open-ended tubular shaped covering member 22, for example, an inflation method may be used. As a result, as shown in FIG. 19A, the optical element stack 21 is covered by the open-ended tubular shaped covering member 22.

Next, by performing a heat treatment for the covering member 22 using a heating furnace or the like, the covering member 22 is preferably heat-shrunk. The reasons for this are that the adhesion between the optical element stack 21 and the covering member 22 can be improved and, in addition, that optical members forming the optical element stack 21 can be more tightly bundled together.

Figure 19B:
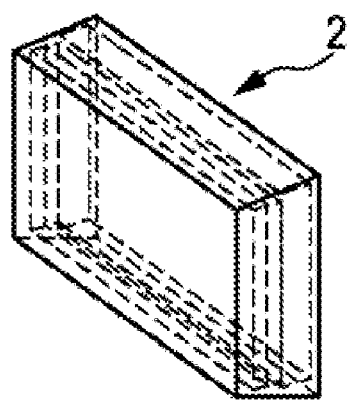

As a result, as shown in FIG. 19B, the intended optical element covering member 2 is obtained in which the four directions of the optical element stack 21 are closed.

In this sixth embodiment, since the support medium 23 and at least one optical element 24 are covered by the covering member 22 having a seamless open-ended tubular shape, a step of bonding the edge portions of the covering member 22 can be omitted. Hence, the efficiency of manufacturing the optical element covering member 2 can be improved.

(7) Seventh Embodiment

According to a seventh embodiment, the bonding step of the covering member 22 in the first embodiment is performed by a first treatment step and a second treatment step. In this embodiment, the first treatment step is a step of bonding the edge portions of the covering member 22 by an adhesive or welding, and the second treatment step is a step of inducing rigidity in the bond portion formed in the first treatment step by cooling.

Hereinafter, with reference to FIGS. 20A to 22B, one example of a method for manufacturing an optical element covering member according to the seventh embodiment will be described.

First, as shown in FIG. 20A, for example, the diffusion plate 23a used as a support medium, the diffusion film 24a, and the lens film 24b, those latter two films being optical elements, are prepared. Next, for example, the diffusion plate 23a, the diffusion film 24a, and the lens film 24b are stacked to each other in that order to form the optical element stack 21.

Next, as shown in FIG. 20B, the optical element stack 21 is placed on the covering member 22 composed of a shrinkable polyester film or the like. Subsequently, as shown by arrows a shown in FIG. 21A, the edge portions of the covering member 22 in the longitudinal direction are pulled up, and the optical element stack 21 is covered so the edge portions of the covering member 22 in the longitudinal direction are brought into contact with each other within or outside one end surface of the optical element stack 21.

Figure 21A:
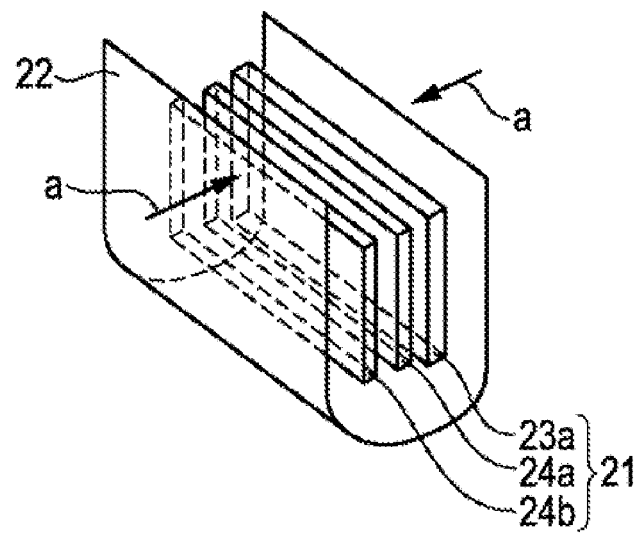
FIGS. 21A and 21B are perspective views each illustrating one example of the method for manufacturing an optical element covering member, according to the seventh embodiment.
Figure 21B:
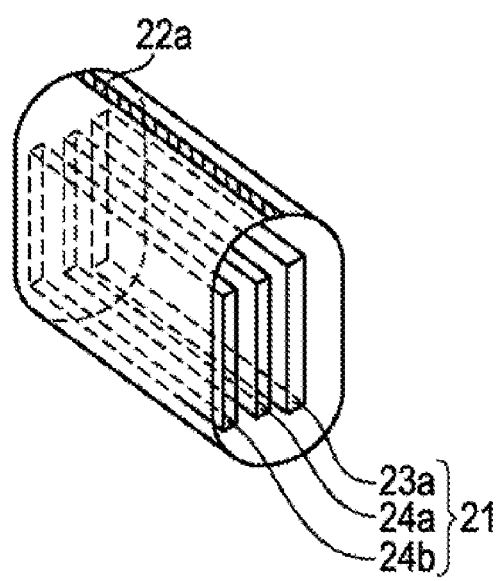
Figure 22A:
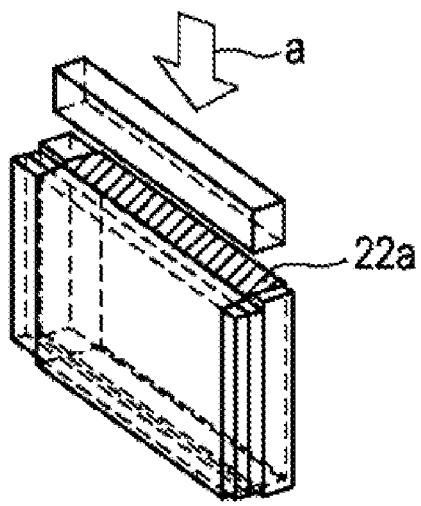
FIGS. 22A and 22B are perspective views each illustrating one example of the method for manufacturing an optical element covering member, according to the seventh embodiment.
Figure 22B:
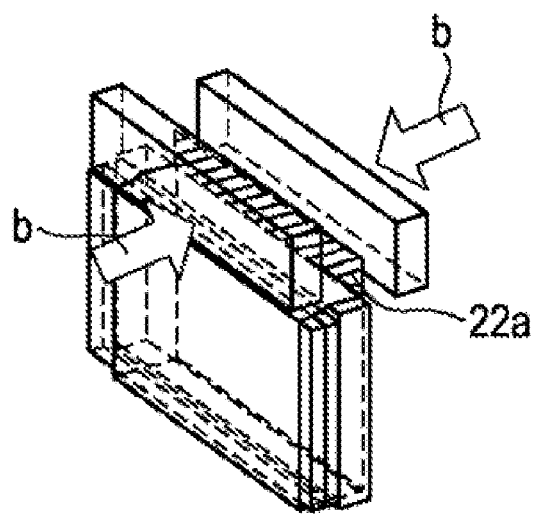
Figure 23:
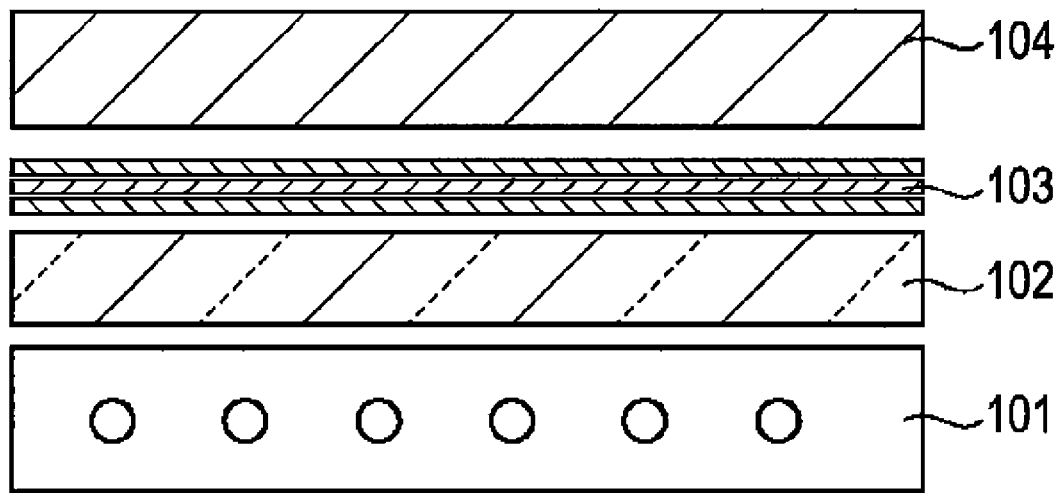
FIG. 23 is a schematic view showing the structure of a related liquid crystal display device.

Next, as shown in FIG. 21B, the edge portions of the covering member 22 in the longitudinal direction are bonded to each other, for example, within or outside the end surface of the optical element stack 21. As a bonding method, for example, there may be mentioned a bonding method using heat, or a bonding method using external energy, such as ultraviolet (UV) rays. Subsequently, as shown in FIG. 22A or 22B, the bond portion formed within or outside the end surface is processed for induction of rigidity by cooling. Accordingly, the optical element stack 21 is covered by the covering member 22 having an open-ended tubular shape.

Next, whenever necessary, an excessive bond portion is removed by cutting. Subsequently, by performing a heat treatment for the covering member 22 using a heating furnace or the like, the covering member 22 is preferably heat-shrunk. The reasons for this are that the adhesion between the optical element stack 21 and the covering member 22 can be improved and, in addition, that optical members forming the optical element stack 21 can be more tightly bundled together.

As a result, as shown in FIG. 9A, the intended optical element covering member 2 is obtained in which the four directions of the optical element stack 21 are closed.

Hereinafter, as described in the above-described method forming an optical element covering member, the bonding method using heat and the bonding method using external energy, such as ultraviolet (UV) rays, will be described.

Bonding Method Using Heat

As means for performing covering/bundling, a method for welding/bonding a covering material itself using heat, and a method using a thermoplastic or a thermosetting adhesive material as a covering material may be used. In the case in which heat is used, a method may be used in which heat is first applied, heating is then stopped when welding is performed, and cooling is finally performed. In addition, in order to prevent the generation of shape defects, such as bending, after covering/bundling is performed, welding is once performed by heating means after the covering, and while the bond portion in a warm state is solidified by cooling, the bond portion is being fixed by applying a pressure, so that the generation of wrinkles and bending in the bond portion can be prevented.

Bonding Method Using External Energy such as UV

As means for performing covering/bundling, a method using UV, IR, or electron rays may be used in which a pre-treated reactive adhesive material is used as a covering material. When external energy, such as the above UV, IR, or electron beams, is used, first, after edge portions to be bonded together are prepared by applying, transferring, or adhering a reactive adhesive material and are then overlapped with each other, the above external energy is irradiated, so that the edge portions can be bonded together to form a bond portion. In this process, in order to prevent the generation of shape defects, such as bending, after the covering/bundling is performed, the shape defects being caused by irradiation heat or reaction heat generated when the external energy is applied, while cooling is performed for the bond portion in a warm state during and after the irradiation, the bond portion is being fixed by applying a pressure, so that the generation of wrinkles and bending in the bond portion can be prevented.

EXAMPLES

Hereinafter, the present application will be described in further detail with reference to examples; however, the present application is not limited only to the examples.

In Table 1, covering materials used in the examples are shown.

TABLE 1

| | Material | Thickness (μm) | Vicat Softening Point (° C.) | Coefficient of Thermal Expansion (×10$^{-5}$/° C.) | Relative Value (%) | Refractive Index |
|---|---|---|---|---|---|---|
| Example 1 | OPP | 40 | 155 | 9.6 | 137 | 1.49 |
| Example 2 | PP/PE/PP | 25 | 134 | 10.5 | 150 | 1.49 |
| Example 3 | PE | 25 | 126 | 11 | 157 | 1.49 |
| Example 4 | SBC | 40 | 86 | 8 | 114 | 1.56 |
| Example 5 | PS | 100 | 105 | 7 | 100 | 1.6 |
| Example 6 | PMMA | 100 | 110 | 7 | 100 | 1.49 |
| Example 7 | PC | 100 | 155 | 6.8 | 97 | 1.59 |
| Example 8 | A-PET (160° C. HEAT TREATMENT) | 200 | 92 | 9 | 129 | 1.57 |
| Example 9 | ZEONOR 1 | 80 | 132 | 7 | 100 | 1.53 |
| Example 10 | ZEONOR 2 | 80 | 155 | 6 | 86 | 1.53 |
| Comparative Example 1 | PETG | 100 | 76 | 7 | 100 | 1.57 |
| Comparative Example 2 | PVC | 100 | 76 | 7 | 100 | 1.57 |
| Comparative Example 3 | A-PET | 200 | 73 | 9 | 129 | 1.57 |
| Comparative Example 4 | PET | 50 | 240 | 2.7 | 39 | 1.65 |
| Comparative Example 5 | — | — | — | — | — | — |

Relative Value: Relative value to the coefficient of thermal expansion (7 × 10–5/° C.) of support medium (diffusion plate).
OPP: Biaxial oriented polypropylene
PP: Polyproplylene
PE: Polyethylene
SBC: styrene-butadiene block copolymer
PS: Polystyrene
PET: Poly(ethylene terephthalate)
PETG: Glycol-modified poly(ethylene terephthalate)
PVC: Poly(vinyl chloride)

The measurement was performed in accordance with JIS-K7206. However, when the film thickness was small, the thickness of a stack was measured instead of using a single layer film.

(Measurement Method for Coefficient of Thermal Expansion)

The measurement was performed using EXSTAR6000 TMA/SS manufactured by Seiko Instruments Inc.

(Measurement Method for Refractive Index)

The measurement was performed using an Abbe-type refractometer.

Example 1

First, the following optical elements were prepared. The optical elements were to be used for a 32-inch television.
(a) Reflection type polarizer (trade name: DBEFD manufactured by Sumitomo 3M Limited), size: 400×710 mm, and thickness: 440 µm.
(b) Lens sheet (Lens manufactured by Sony Corp. having a hyperbolic curve by extrusion molding of polycarbonate (PC)), size: 400×710 mm, thickness: 400 µm, and pitch: 200 µm.
(c) Diffusion sheet (Trade name: BS-912 manufactured by Keiwa Inc.), size: 400×710 mm, and thickness 220 µm.
(d) Diffusion plate (Trade name: RM802 manufactured by Sumitomo Chemical Co., Ltd.), size: 400×710 mm, and thickness: 1,500 µm.
(e) Light control film (brightness-irregularity-reducing film) (LCF having a hyperbolic curve by extrusion molding of polycarbonate (PC)), size: 400×710 mm, thickness: 200 µm, and pitch: 200 µm.

Next, on the light control film, the diffusion plate, the diffusion sheet, the lens sheet, and the reflection type polarizer were placed in that order. As a result, an optical element stack was obtained. Next, a heat-shrinkable sheet-shaped biaxial oriented polypropylene film (hereinafter referred to as "OPP") having a thickness of 40 µm was prepared. Next, end surfaces of the OPP film were welded together to form a bag shape having a size of 420 mm by 720 mm. Next, after the above optical element stack was inserted in the bag-shaped OPP film and was transported in an oven at a temperature of 80 to 100° C., so that the OPP film was shrunk.

As a result, an intended optical element covering member was obtained.

Example 2

An optical element covering member was obtained in a manner similar to that in Example 1 except that a three-layered film having a thickness of 25 µm was used as the covering member, the film including a PP film, a PE film, and a PP film stacked to each other in that order.

Example 3

An optical element covering member was obtained in a manner similar to that in Example 1 except that a PE film having a thickness of 25 µm was used as the covering member.

Example 4

An optical element covering member was obtained in a manner similar to that in Example 1 except that a styrene-butadiene copolymer (SBC) film having a thickness of 40 µm was used as the covering member.

Example 5

An optical element stack was first obtained in a manner similar to that in Example 1. Next, a PS film having a size of 803 mm by 750 mm and a thickness of 100 µm was prepared. Subsequently, after edge portions of this PS film in the longitudinal direction were boned to each other to form a tube shape, the above optical element stack was inserted in this open-ended tubular shaped PS film.

As a result, an intended optical element covering member was obtained.

Example 6

An optical element covering member was obtained in a manner similar to that in Example 5 except that a poly(methyl methacrylate) (PMMA) film having a thickness of 100 µm was used as the film.

Example 7

An optical element covering member was obtained in a manner similar to that in Example 5 except that a PC film having a thickness of 100 µm was used as the film.

Example 8

An optical element covering member was obtained in a manner similar to that in Example 5 except that an amorphous poly(ethylene terephthalate) (A-PET) film having a thickness of 200 µm was used as the film.

Example 9

An optical element covering member was obtained in a manner similar to that in Example 5 except that a ZEONOR 1 (registered trademark) film having a thickness of 80 µm was used as the film.

Example 10

An optical element covering member was obtained in a manner similar to that in Example 5 except that a ZEONOR 2 (registered trademark) film having a thickness of 80 µm was used as the film.

Comparative Example 1

An optical element covering member was obtained in a manner similar to that in Example 5 except that a glycol-modified poly(ethylene terephthalate) (PETG) film having a thickness of 100 µm was used as the film.

Comparative Example 2

An optical element covering member was obtained in a manner similar to that in Example 5 except that a poly(vinyl chloride) (PVC) film having a thickness of 100 µm was used as the film.

Comparative Example 3

An optical element covering member was obtained in a manner similar to that in Example 5 except that an A-PET film having a thickness of 200 µm was used as the film.

Comparative Example 4

An optical element covering member was obtained in a manner similar to that in Example 5 except that a PET film having a thickness of 50 µm was used as the film.

Comparative Example 5

An optical element stack was obtained in a manner similar to that in Example 1.
Mounting Test
As a mounting test apparatus, a 32-inch liquid crystal display television (trade name: LCDTV-KDLS2500 manufactured by Sony Corp.) was prepared. Next, after optical elements, that is, a diffusion plate, a diffusion film, a prism sheet, and a reflection type polarizing sheet, of a backlight unit of this liquid crystal display television were removed, and the optical element covering members or the optical element stacks of Examples 1 to 10 and Comparative Examples 1 to 5 were then again mounted, luminance evaluation, appearance evaluation, appearance evaluation at a high-temperature atmosphere, and storage evaluation were performed. Hereinafter, the evaluation methods will be described in detail.

Luminance Evaluation Method

After the optical element covering member or the optical element stack was mounted, aging was performed for 2 hours while the backlight was turned on, and subsequently, the evaluation was performed.

Measurement device: By using CS-1000 manufactured by Konica Minolta Holdings Inc., measurement was performed three times, and the average luminance obtained therefrom was used for evaluation. The evaluation was performed such that the luminance obtained when the optical element stack, which was not covered by the covering member, was mounted in the mounting test apparatus was regarded as 100%.

Appearance Evaluation of Panel Display

The appearance evaluation standard is shown below.

5: No luminance irregularities (no luminescent spots) at a front side and at a viewing angle of 60°;

4: No on-axis luminance irregularities/extremely slight luminance irregularities (including luminance spots) at a viewing angle of 60°;

3: Extremely slight on-axis luminance irregularities/slight luminance irregularities (including luminescent spots) at a viewing angle of 60°;

2: Slight on-axis luminance irregularities/luminance irregularities (including luminescent spots) at a viewing angle of 60°; and 1: Apparent luminance irregularities at a front side and a viewing angle of 60°.

In this evaluation, a panel display at a level of "3" or above can be used without causing any practical problems.

Lighting Test of Panel Display by High-Temperature Mounting at 45° C.

The appearance evaluation standard is shown below.

5: No luminance irregularities (no luminescent spots) at a front side and at a viewing angle of 60°;

4: No on-axis luminance irregularities/extremely slight luminance irregularities (including luminance spots) at a viewing angle of 60°;

3: Extremely slight on-axis luminance irregularities/slight luminance irregularities (including luminescent spots) at a viewing angle of 60°;

2: Slight on-axis luminance irregularities/luminance irregularities (including luminescent spots) at a viewing angle of 60°; and 1: Apparent luminance irregularities at a front side and a viewing angle of 60°.

In this evaluation, a panel display at a level of "3" or above can be used without causing any practical problems.

Storage Test for Optical Element Covering Member

The optical element covering members were placed flatly and were held in a dry atmosphere at 85° C. for 100 hours, and the appearance and warping conditions in the flatly placed state were measured using a metal ruler for evaluation.

The results of the above-described luminance evaluation, appearance evaluation, appearance evaluation at a high-temperature atmosphere, and storage test are shown in Table 2.

TABLE 2

| | | TV Mounting Test | | | Storage Test for Optical Element Covering Member (85° C. × 100 hours) | |
|---|---|---|---|---|---|---|
| | | Room-Temperature Atmosphere | | Display | | |
| | | Luminance | | Appearance | | |
| | Sheet Structure | Relative Value (%) | Display Appearance | at 45° C.-Atmosphere | Warpage (mm) | Appearance |
| Example 1 | Structure (1) | 98 | 5 | 5 | 2 | No change, superior |
| Example 2 | Structure (1) | 98 | 5 | 5 | 2 | No change, superior |
| Example 3 | Structure (1) | 98 | 5 | 5 | 2 | No change, superior |
| Example 4 | Structure (1) | 95 | 5 | 5 | 2 | No change, superior |
| Example 5 | Structure (1) | 95 | 4 | 4 | 3 | No change, superior |
| Example 6 | Structure (1) | 97 | 4 | 4 | 2 | No change, superior |
| Example 7 | Structure (1) | 94 | 5 | 5 | 4 | No change, superior |
| Example 8 | Structure (1) | 94 | 4 | 4 | 3 | No change, superior |
| Example 9 | Structure (1) | 96 | 4 | 4 | 4 | No change, superior |
| Example 10 | Structure (1) | 96 | 4 | 4 | 3 | No change, superior |
| Comparative Example 1 | Structure (1) | 94 | 4 | 2 | 2 | No change, superior |
| Comparative Example 2 | Structure (1) | 95 | 4 | 2 | 3 | No change, superior |

TABLE 2-continued

| | | TV Mounting Test | | | Storage Test for Optical Element Covering Member (85° C. × 100 hours) | |
|---|---|---|---|---|---|---|
| | | Room-Temperature Atmosphere | | Display | | |
| | | Luminance | | Appearance | | |
| | Sheet Structure | Relative Value (%) | Display Appearance | at 45° C.- Atmosphere | Warpage (mm) | Appearance |
| Comparative Example 3 | Structure (1) | 94 | 5 | 2 | 3 | No change, superior |
| Comparative Example 4 | Structure (1) | 92 | 3 | 1 | 12 | Convex warping at light source side |
| Comparative Example 5 | Structure (2) | 100 | 1 | 1 | 2 (single diffusion plate) | Generation of undulation of LCF |

Structure (1): covering film/DBEF/lens/DS/DP/LCF/covering film
Structure (2): DBEF/lens/DS/DP/LCF Results The following are apparent from Table 2.

In Comparative Example 5 in which the optical elements were not covered by the covering member, since the LCF was not supported, bending and undulation were generated between the diffusion plate and the cold cathode fluorescent lamp (CCFL).

In addition, in Comparative Example 4 in which the relative value to the coefficient of thermal expansion of the support medium was small, such as 39%, since the coefficient of thermal expansion of the support medium was large among the covering members, the optical element covering member was bent. As a result, polarization irregularities (light leakage when display is set at off-state) were generated in the LCD-TV display device. Accordingly, by the storage test for the optical element covering member of Comparative Example 4, overall warping was generated. Because of this warping generation, the liquid crystal display panel was pressurized; hence, polarization irregularities were generated, and appearance defects were generated thereby.

In contrast, in Examples 1 to 10 and Comparative Examples 1 to 3 in which the coefficient of thermal expansion was 85% to 160% of that of the support medium, a large change in warping during the high-temperature storage was not observed. However, in Comparative Examples 1 to 3 in which the Vicat softening point was less than 85° C., in the TV high-temperature mounting test, the change was generated at a pin portion supporting the diffusion plate, and hence luminance irregularities were generated.

Accordingly, in order to suppress appearance defects caused by warping and/or deformation of the optical element covering member, it is preferable that the coefficient of thermal expansion relative to that of the support medium be set in the range of 85% to 160%, and that the Vicat softening point be set to more than 85° C.

In addition, as for the influence on the on-axis luminance, when the refractive index of the covering member is set to 1.6 or less, the on-axis luminance can be maintained at 95% of that of the standard structure which is composed of DBEFD/Lens/diffusion sheet/diffusion plate/LCF. By the use of the optical element covering member, the on-axis luminance is degraded; however, although the optical element covering member includes the standard optical elements, the above degradation can be suppressed. The reason for this is believed that in the case in which the optical element covering member is not formed, and undulation is generated thereby, emission light is scattered by undulation of Lens provided in the light ray direction.

As previously discussed, embodiments of the present application have been particularly described; however, the present application is not limited to the above embodiments and modification thereof may be made.

For example, the numerical values in the above embodiments are merely described by way of example, and whenever necessary, different values may be used. In addition, the structures of the above embodiments may be used in combination in an embodiment.

In addition, in the above embodiments, the optical elements themselves or the optical element and the support medium may be partly bonded together so as not to degrade the optical functions, and in order to suppress the degradation in display functions, the above bond part is preferably provided at an edge portion.

In addition, in the above embodiments, the case in which the film material or the sheet material is used as the covering member was described by way of example; however, a case having rigidity to some extent may be used as the covering member.

In addition, in the above embodiments, the covering member 22 may be bonded to at least one of the support medium 23 and the at least one of the optical elements 24, which are covered by this covering member 22. As a bonding method, for example, adhesion by an adhesive or welding may be mentioned. As the adhesion method using an adhesive, for example, a hot-melt adhesion method, a thermosetting adhesion method, a pressure-sensitive (tacky adhesive) adhesion method, an energy ray curing adhesion method, or a hydration adhesion method may be mentioned. As the adhesion method by welding, for example, thermal welding, ultrasonic welding, or laser welding may be mentioned.

In addition, in the above embodiments, a reflection portion reflecting light emitted from the end surfaces of the optical element covering member 2 may be partly or entirely provided therefor. The reflection portion is provided, for example, on at least one place selected from the inner and outer surfaces of the covering member 22, a position between the covering member 22 and the optical element stack 21, and the end surfaces of the optical element stack 21. As the reflection portion, for example, at least one of an inorganic film, such as a metal reflection film, a metal oxide film, or a metal multilayer film; an organic multilayer reflection film, such as a high molecular weight multilayer film; a polymer resin layer containing a filler; a hollow polymer resin layer; and a structural reflection member may be used, and in particular, a white PET film containing air bubbles and a filler, such as titanium oxide, may be used. As the structural reflection member, for example, a surface structured member having an approximately prism shape may be used.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An optical element covering member comprising:
   at least one optical element;
   a support medium supporting the optical element; and
   a covering member covering the optical element and the support medium,
   wherein the covering member has a Vicat softening point of more than 85° C.;
   the covering member, has a coefficient of thermal expansion in the range of 85% to 160% of the coefficient of thermal expansion of the support medium; and
   the covering member comprises a first region on which light is incident from a light source, and a second region from which the light incident on the first region is emitted, further comprising a surface structured member or an optical functional layer in at least one of the first and the second regions.

2. The optical element covering member according to claim 1, wherein the optical element and the support medium form a stack.

3. The optical element covering member according to claim 1, wherein the optical functional layer is at least one of a light diffusion functional layer, a light condensation functional layer, a reflection type polarization functional layer, a polarizer functional layer, and a light division functional layer.

4. The optical element covering member according to claim 1, wherein the covering member has a belt shape; and edge portions of the covering member having a belt shape are bonded to each other.

5. The optical element covering member according to claim 1, wherein the covering member includes covering parts each having a belt shape, the covering parts cover the optical element and the support medium in directions different from each other.

6. The optical element covering member according to claim 1, wherein the covering member is an open-ended tubular shaped covering member.

7. The optical element covering member according to claim 1, wherein the covering member has a seamless open-ended tubular shape.

8. The optical element covering member according to claim 1, wherein the covering member is a heat-shrinkable covering member.

9. The optical element covering member according to claim 1, wherein the covering member is bonded to at least one of the optical element and the support medium.

10. The optical element covering member according to claim 1, wherein the covering member has a refractive index of 1.6 or less at least one of a light incident side and a light emission side.

11. The optical element covering member according to claim 1, wherein
   the optical elements themselves or the optical element and the support medium are partly bonded together.

12. The optical element covering member according to claim 11, wherein the bond part is provided at an edge portion.

13. The optical element covering member according to claim 1, wherein the support medium comprises one of a diffusion plate and a transparent plate.

14. The optical element covering member according to claim 1, further comprising a reflection portion at an end surface of the optical element or in the vicinity of the end surface.

15. A backlight comprising:
   a light source emitting light; and
   an optical element covering member which improves properties of the light emitted from the light source and which emits the light to a liquid crystal panel,
   wherein the optical element covering member includes:
   at least one optical element;
   a support medium supporting the optical element; and
   a covering member covering the optical element and the support medium,
   the covering member has a Vicat softening point of more than 85° C., and
   the covering member has a coefficient of thermal expansion in the range of 85% to 160% of the coefficient of thermal expansion of the support medium; and
   the covering member comprises a first region on which light is incident from a light source and a second region from which the light incident on the first region is emitted, further comprising a surface structured member or an optical functional layer in at least one of the first and the second regions.

16. The backlight according to claim 15,
   wherein the optical functional layer is at least one of a light diffusion functional layer, a light condensation functional layer, a reflection type polarization functional layer, a polarization functional layer, and a light division functional layer.

17. The backlight according to claim 15, wherein the optical elements themselves or the optical element and the support medium are partly bonded together.

18. The backlight according to claim 17, wherein the bond part is provided at an edge portion.

19. A liquid crystal display device comprising:
   a light source emitting light;
   an optical element covering member which improves properties of the light emitted from the light source;
   a liquid crystal panel which displays an image based on the light having the properties improved by the optical element covering member, where in the optical element covering member includes:
   at least one optical element;
   a support medium supporting the optical element; and
   a covering member covering the optical element and the support medium,
   the covering member has a Vicat softening point of more than 85° C., and
   the covering member has a coefficient of thermal expansion in the range of 85% to 160% of the coefficient of thermal expansion of the support medium; and the covering member comprises a first region on which light is incident from a light source and a second region from which the light incident on the first region is emitted, further comprising a surface structured member or an optical functional layer in at least one of the first and the second regions.

20. The liquid crystal display device according to claim 19, wherein the optical functional layer is at least one of a light diffusion functional layer, a light condensation functional layer, a reflection type polarization functional layer, a polarization functional layer, and a light division functional layer.

21. The liquid crystal display device according to claim 19, wherein the optical elements themselves or the optical element and the support medium are partly bonded together.

22. The liquid crystal display device according to claim 21, wherein the bond part is provided at an edge portion.

* * * * *